(12) United States Patent
Mann et al.

(10) Patent No.: US 12,487,119 B2
(45) Date of Patent: Dec. 2, 2025

(54) INTEGRAL FIELD SPECTRAL IMAGER

(71) Applicant: Nanohmics, Inc., Austin, TX (US)

(72) Inventors: Chris W. Mann, Austin, TX (US); Kieran Lerch, Hood River, OR (US); Alexander P. Greis, Austin, TX (US); Austin Ferrie, Happy Valley, OR (US)

(73) Assignee: Nanohmics, Inc., Austin, TX (US)

( * ) Notice: Subject to any disclaimer, the term of this patent is extended or adjusted under 35 U.S.C. 154(b) by 165 days.

(21) Appl. No.: 18/406,301

(22) Filed: Jan. 8, 2024

(65) Prior Publication Data

US 2024/0230402 A1 Jul. 11, 2024

Related U.S. Application Data

(60) Provisional application No. 63/479,014, filed on Jan. 9, 2023.

(51) Int. Cl.
*G01J 1/04* (2006.01)
*G01J 3/28* (2006.01)

(52) U.S. Cl.
CPC ............ *G01J 1/0437* (2013.01); *G01J 1/0411* (2013.01); *G01J 1/0429* (2013.01); *G01J 3/2823* (2013.01)

(58) Field of Classification Search
CPC ...... G01J 1/0411; G01J 1/0429; G01J 1/0437; G01J 3/2823; G01J 2003/2806; G01J 2003/2826

See application file for complete search history.

(56) References Cited

U.S. PATENT DOCUMENTS 6,095,673 A 8/2000 Goto et al.
6,903,859 B2 6/2005 Sandström
(Continued)

FOREIGN PATENT DOCUMENTS

EP 3339821 A1 6/2018
EP 3348974 A1 7/2018
(Continued)

OTHER PUBLICATIONS

Geelen, B et al., "A compact snapshot multispectral imager with a monolithically integrated, per-pixel filter mosaic", Proc. of SPIE vol. 8974: pp. 89740L-1-89740L-8, (2014).
(Continued)

*Primary Examiner* — Kevin K Pyo
(74) *Attorney, Agent, or Firm* — Pierson IP, PLLC

(57) ABSTRACT

An integral field spectral imager has a plurality of optical homogenizers. Each optical homogenizer is in-register with a corresponding different superpixel in a superpixel array and is configured to spatially homogenize incident EMR and to pass the spatially homogenized EMR to a spectral filter in an array of spectral filters, thence to the in-register, corresponding different superpixel. Baffles are included to maximize confinement of the spatially homogenized EMR passed by a single optical homogenizer to the in-register, corresponding different superpixel so as to minimize crosstalk between superpixels. Optical homogenizers and baffles are designed to produce a pattern of homogenized EMR on a superpixel, regardless of where incident EMR is received on an optical homogenizer. Methods for using embodiments of the spectral imager in a variety of spectral bands in the EMR spectrum enable determining spectral information about incident EMR.

20 Claims, 22 Drawing Sheets

(56) References Cited

U.S. PATENT DOCUMENTS

| | | |
|---|---|---|
| 9,772,229 B2 | 9/2017 | Geelen et al. |
| 9,857,222 B2 | 1/2018 | Geelen et al. |
| 10,136,077 B1 | 11/2018 | Twede et al. |
| 10,254,164 B2 | 4/2019 | Zollars et al. |
| 2012/0212737 A1* | 8/2012 | Comstock, II ........ G01J 3/2823 356/326 |
| 2016/0156883 A1 | 6/2016 | Han et al. |
| 2016/0305820 A1* | 10/2016 | Zollars ............... G01N 15/1434 |
| 2018/0204863 A1 | 7/2018 | Tack et al. |
| 2020/0408598 A1 | 12/2020 | Toda et al. |
| 2022/0006994 A1 | 1/2022 | Borremans et al. |
| 2022/0115420 A1 | 4/2022 | Yoon |
| 2022/0156479 A1 | 5/2022 | Wang et al. |

FOREIGN PATENT DOCUMENTS

| | | |
|---|---|---|
| EP | 3450938 A1 | 3/2019 |
| EP | 3633334 A1 | 4/2020 |
| WO | 03048839 A1 | 6/2003 |

OTHER PUBLICATIONS

Hagen, N et al., "Review of Snapshot Spectral Imaging Technologies", Optical Engineering vol. 52(9): pp. 090901-1-090901-23, (Sep. 23, 2013).

Huang, E et al., "Etalon Array Reconstructive Spectrometry", Nature SciReports vol. 7:40693: pp. 1-6, (Jan. 11, 2017).

Kohlgraf-Owens, T et al., "Transmission matrices of random media: means for spectral polarimetric measurements", Optics Lett vol. 35(13): pp. 2236-2238, (Jun. 25, 2010).

Kondasz, B et al., "Homogenization with coherent light illuminated beam shaping diffusers for vision applications: spatial resolution limited by speckle pattern", J European Optical Soc-RapidPub vol. 14(27): pp. 1-7, (Nov. 27, 2018).

Li, Q et al., "Review of spectral imaging technology in biomedical engineering:Achievements and challenges", J Biomed Optics vol. 18(10): pp. 100901-1-100901-28, (Oct. 10, 2013).

Miller, JL "Multispectral infrared bidirectional reflectance distribution function forward-scatter measurements of common infrared black surface preparations and materials", Opt Engineering vol. 45(5): pp. 056401-1-056401-8, (May 31, 2006).

Redding, B et al., "Compact spectrometer based on a disordered photonic chip", Nature Photonics vol.(7): pp. 746-751, (Jul. 28, 2013).

Roos, A et al., "Optical Properties and Surface Composition of Oxidized Copper for Solar Absorbers", Solar Energy Mater vol. 9: pp. 367-389, (1984).

Cai, X et al., "One-shot ultraspectral imaging with reconfigurable metasurfaces." arXiv: Optics (2020): pp. 1-21, (May 6, 2020).

Zhou, L et al., "A novel optical diffuser based on polymer microballs-filled nematic liquid crystal composite film", RSC Adv. vol. 8: pp. 40347-40357,(2018).

Zhou, L et al., "Optical diffusers based on uniform nano-sized polymer balls/nematic liquid crystals composite films", Liquid Crystals vol. 47(5): pp. 785-798, (Oct. 29, 2019).

* cited by examiner

INTEGRAL FIELD SPECTRAL IMAGER

CROSS REFERENCE TO RELATED APPLICATIONS

This application claims the benefit of U.S. Provisional Patent Application No. 63/479,014 filed Jan. 9, 2023, which is incorporated by reference herein in its entirety.

STATEMENT OF FEDERALLY SPONSORED RESEARCH

The invention was made, in part, with government support under contract M6785421C6511 awarded by Marine Corps Systems Command. The government has certain rights in the invention.

TECHNICAL FIELD

The invention relates to spectral imaging, in particular to an integral field spectral imager and to methods for using the spectral imager to determine spectral information about incident electromagnetic radiation received by the imager.

GENERAL DESCRIPTION

Spectral imaging is used in a variety of scientific applications in which specific wavelengths of electromagnetic radiation (EMR) reflecting from or emitted by an object can provide useful information about the object, such as by way of example only, its material composition, its material classification (e.g., paper vs. plastic), as well as quantitative knowledge about associated lighting conditions during measurements.

Chip-scale spectral imagers are commercially available, but many are compromised by performance challenges. Many chip-scale spectral imagers are traditionally mosaic imagers, in which each pixel in the mosaic has a spectral filter that samples the spectral content of the electromagnetic spectrum from a scene, at a single spatial location. Because each pixel measures a different part of the spectrum and a different spatial section of the scene, the resulting spectral datacube is undersampled, and interpreting the data typically requires a demosaicing algorithm. However, if a scene has high spatial frequency content, demosaicing algorithms often fail, producing artifacts that corrupt subsequent analysis.

Intentionally defocusing the camera is often proposed for addressing problems associated with undersampling in mosaic systems, e.g., unwanted aliasing effects in which spatial variations in a scene can couple into erroneous spectral variation in a measured datacube. However, defocusing can reduce the acquisition of spatial information, thereby eliminating the advantages of increased spatial information. Furthermore, because demosaicing algorithms may assign spectral measurements to incorrect spatial origins or otherwise cause poor, non-reproducible, or incomplete sampling of the scene, defocusing typically does not eliminate erroneous spectral variations in the datacube. Numerous types of imaging systems have been employed in unsuccessful attempts to address undersampling errors, but the fundamental problem remains any time a camera uses a mosaic.

BRIEF DESCRIPTION OF THE DRAWINGS

The following drawings form part of the specification and are included to further demonstrate certain embodiments described herein. Embodiments may be better understood by reference to one or more of these drawings in combination with the detailed description of the embodiments presented herein. Drawings are not necessarily drawn to scale or intended to be. For purposes of clarity, every component or structure that may be part of a spectral imager embodiment may not be depicted in every drawing. The use of a letter following an element number is for descriptive purposes only. For example, 104a and 104b each refer to a pixel 104, but may refer to different pixels in a figure as an aid in understanding the description of the drawing. In some drawings and views, for purposes of clarity and for understanding embodiments of the invention, the relative sizes of structural elements are not necessarily reflective of actual relative sizes in embodiments of the invention.

DETAILED DESCRIPTION

Figure 1A:
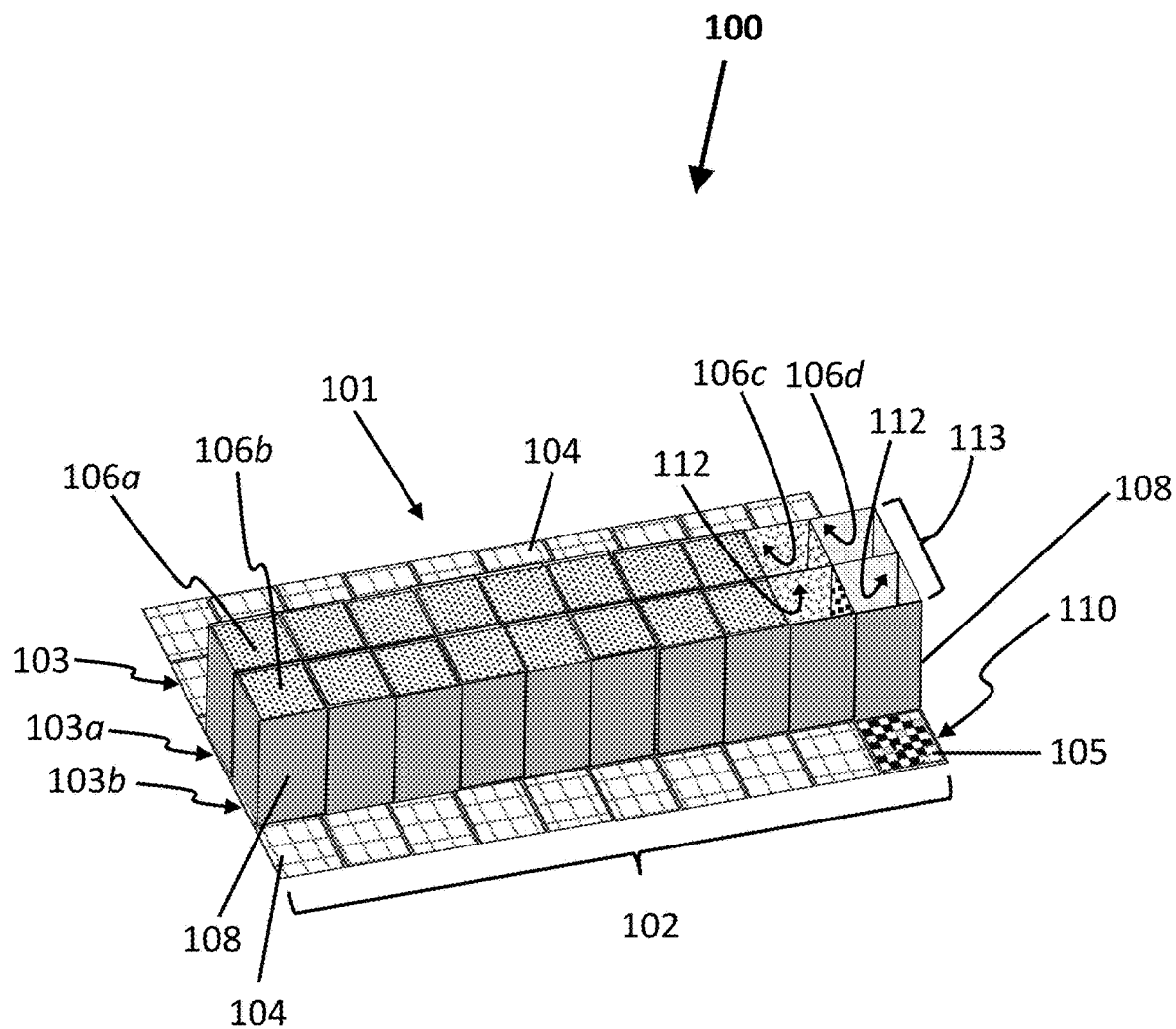
FIGS. 1A-1E show schematic views of an exemplary embodiment of a spectral imager and associated elements.

Reference will now be made in detail to certain exemplary embodiments, some of which are illustrated in the accompanying drawings. Certain terms used in the application are first defined. Additional definitions may be provided throughout the application.

The symbol "~" which means "approximately", and the terms "about" or "approximately" are defined as being close to, as would be understood by one of ordinary skill in the art. In an exemplary non-limiting embodiment, the terms may be used to mean within 10%, within 5%, within 1%, or within 0.5% of a stated value. For example, "about 4" or "~ 4" may mean from 3.6-4.4 inclusive of the endpoints 3.6 and 4.4, and "about 1 nm" may mean from 0.9 nm to 1.1 nm inclusive of the endpoints 0.9 nm and 1.1 nm. All ranges described herein are inclusive of the lower and upper limit values.

As used herein, the term "equal" and its relationship to the values or characteristics that are "substantially equal" would be understood by one of skill in the art. Typically, "substantially equal" can mean that the values or characteristics referred to may not be mathematically equal but would function as described in the specification and/or claims. As used herein, "substantially" may mean "largely but not wholly". The terms "substantially" and "approximately" may account for industry-accepted tolerance for the corresponding term and/or relativity between items.

As used herein, the phrases "at least one of A or B", "one or more of A or B", "at least one of A and B", and "one or more of A and B" are each meant to include one or more of only A, one or more of only B, or any combination and number of A and B. Any combinations having a plurality of one or more of any of the elements or steps listed are also meant to be included by the use of these phrases. For example, the combinations of 1A and 1B, 2A and 1B, 2B and 1A, and 2B and 2A are included. Similar phrases for longer lists of elements or steps (e.g., "at least one of A, B, or C" and "at least one of A, B, and C") are also contemplated to indicate one or more of either element or step alone or any combination including one or more of any of the elements or steps listed. As used herein, "one or more of" means "one or more than one of".

Embodiments described herein include an integral field spectral imager 100 and methods of fabricating embodiments of the spectral imager that provide simpler manufacturing and assembly and more intuitive operation over previously described spectral imaging technology. Some embodiments are directed to addressing the aforementioned problems associated with undersampling and demosaicing and employ a strategy that is contrary to traditional approaches. Rather than seeking higher spatial resolution or defocusing an optic to reduce spatial-spectral artifacts in images, spectral imager embodiments described herein are configured to intentionally coarsen the spatial resolution at the detector (image sensor 101) surface to prevent the need for antialiasing filters and enable more usual prescriptions and types of foreoptics. Resulting images may appear less appealing to the eye, but also may be more useful with machine perception systems. Furthermore, spectral imager embodiments described herein do not require a spatial filter in the form of an entrance slit, thereby greatly improving fill factor. The novel strategy allows for more flexible integration with external optics. Spectral imager 100 is typically more amenable to the use of faster (lower f-number) optics that may not require precision matching to micro-optical elements.

In many embodiments, an integral field spectral imager may comprise an image sensor comprising a superpixel array having a plurality of superpixels, each superpixel comprising at least four pixels; a plurality of optical homogenizers, each optical homogenizer being in-register with a corresponding different superpixel in the superpixel array, being positioned to receive electromagnetic radiation (EMR), and being configured to spatially homogenize the received electromagnetic radiation and to pass the spatially homogenized electromagnetic radiation to the in-register, corresponding different superpixel; an optical filter array positioned between each optical homogenizer and the in-register, corresponding different superpixel and comprising a plurality of spectral filters, wherein at least four spectral filters in the plurality of spectral filters are configured to spectrally filter the spatially homogenized electromagnetic radiation differently from one another and to pass the spectrally filtered, spatially homogenized electromagnetic radiation to the in-register, corresponding different superpixel, and wherein each of the at least four pixels is in-register with a different one of the at least four differently configured spectral filters and is positioned to receive the spectrally filtered, spatially homogenized electromagnetic radiation passed by the in-register spectral filter; and, a plurality of baffles, each baffle being configured and positioned to maximize confinement of the spatially homogenized radiation passed to the in-register, corresponding different superpixel. Spectral filters that are configured to spectrally filter the spatially homogenized electromagnetic radiation differently from one another are considered to be differently configured spectral filters.

In some embodiments, a method of determining spectral information about incident EMR received by spectral imager 100 comprises exposing spectral imager 100 to incident EMR, measuring an electrical response of the at least four pixels in each corresponding different superpixel to the spectrally filtered, spatially homogenized electromagnetic radiation passed to each of the at least four pixels, and based on analysis of the electrical responses of the at least four pixels in each corresponding different superpixel determining spectral information about the electromagnetic radiation received by the optical homogenizer and passed to the in-register corresponding different superpixel.

Figure 1B:
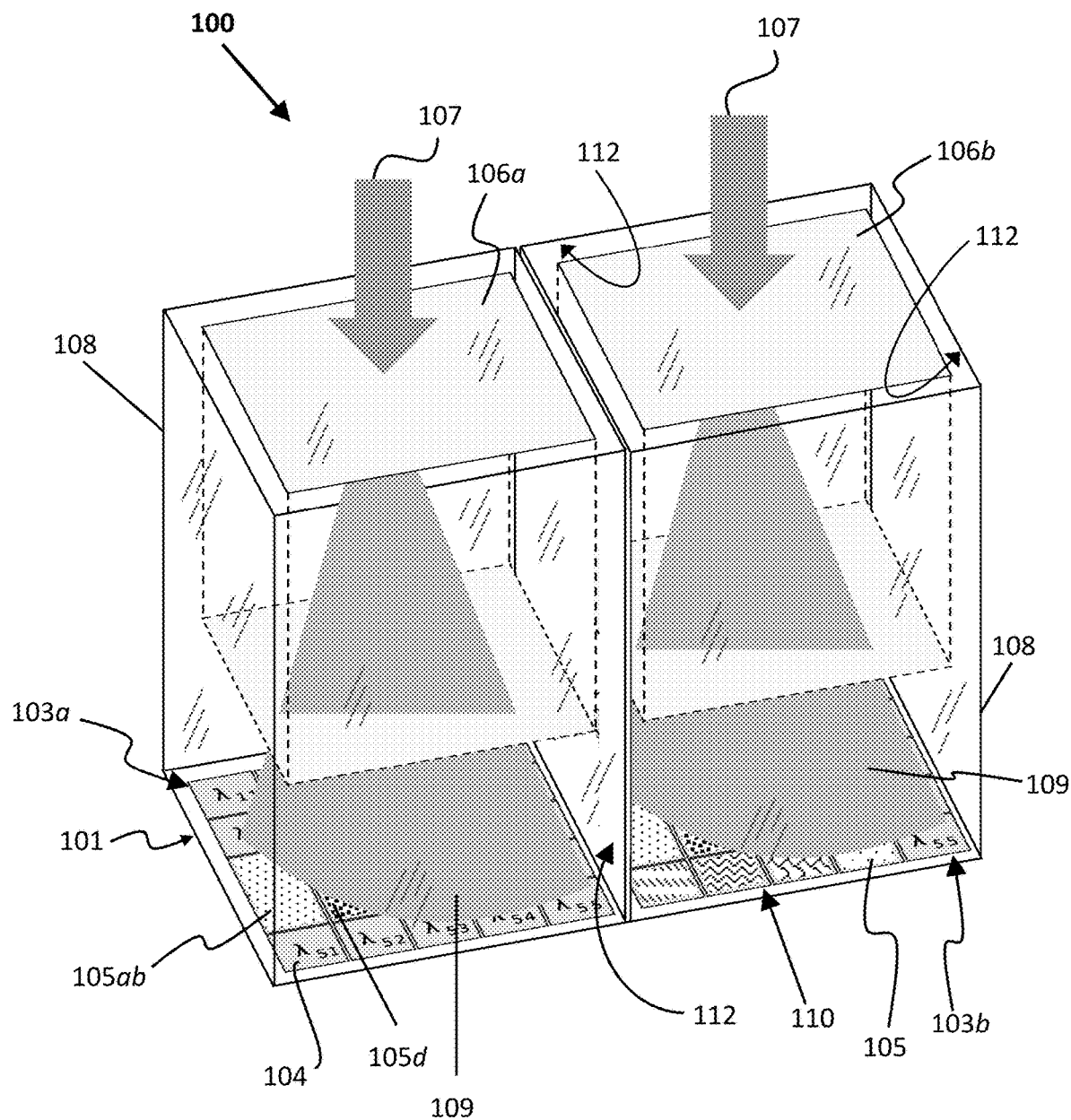
Figure 1C:
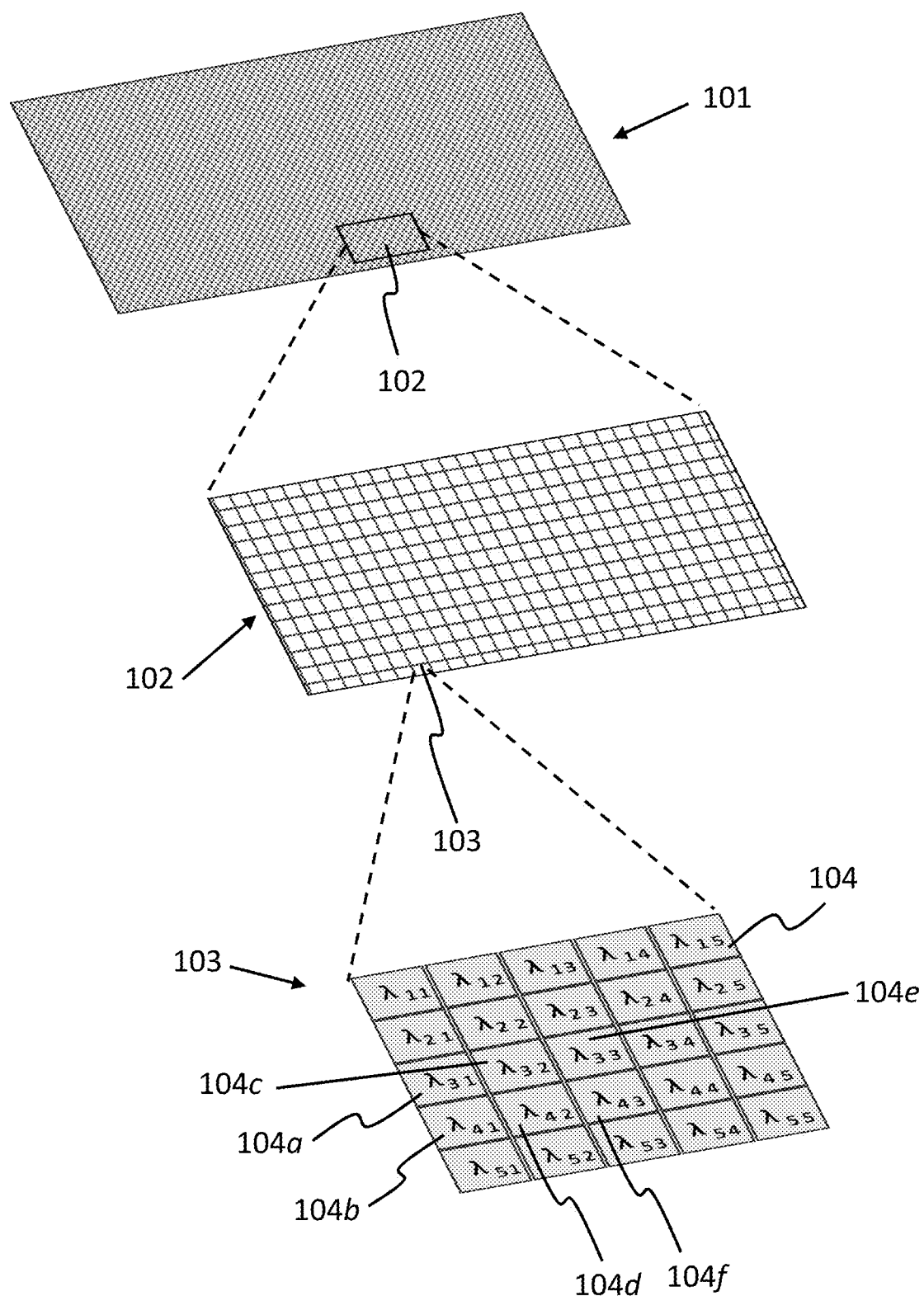

FIGS. 1A-1E show schematic views of an exemplary embodiment of a spectral imager 100 and exemplary embodiments of associated elements and structures. Spectral imager 100 comprises image sensor 101, the image sensor 101 comprising a superpixel array 102 having a plurality of superpixels 103, each superpixel 103 comprising at least four pixels 104 (FIGS. 1A-1C). Spectral imager 100 comprises a plurality 113 (FIG. 1A) of optical homogenizers 106 (e.g., 106a, 106b, 106c, 106d in FIG. 1A; 106a, 106b in FIG.-1B). Each optical homogenizer 106 in the plurality of optical homogenizers 113, is in-register with a corresponding different superpixel 103 in superpixel array 102, is positioned to receive incident EMR 107 (FIG. 1B) and is configured to spatially homogenize the received incident EMR 107 and to pass the spatially homogenized EMR 109 (FIG. 1B) to the in-register corresponding different superpixel 103. In the exemplary embodiments shown in FIGS. 1A-1B, optical homogenizer 106a is in-register with superpixel 103a and optical homogenizer 106b is in-register with superpixel 103b. For an optical homogenizer 106 that is in-register with a corresponding different superpixel 103 it may also be said that the corresponding different superpixel 103 is in-register with the corresponding optical homogenizer 106. That is for example, optical homogenizer 106a is in-register with superpixel 103a, and superpixel 103a is in-register with optical homogenizer 106a. An optical homogenizer 106 and a corresponding different superpixel 103 that are in-register with each other may be referred to as "in-register optical homogenizer" and "in-register corresponding different superpixel" respectively.

An exemplary superpixel 103 comprising a 5×5 array of pixels 104 is enlarged in the lower part of FIG. 1C. Typically, superpixel 103 comprises at least four pixels 104, for example at least a 2×2 array of pixels 104. In FIG. 1C, pixels 104 are labeled to correspond to their position in the superpixel 103, by row number and column number in the superpixel, with the prefix 2. For example, the pixel at row 1, column 1 is designated $\pi_{11}$ and the pixel at row 5, column 1 is designated $\lambda_{51}$. In FIG. 1C, pixels 104a, 1046, 104c, 104d, 104e, and 104f correspond to pixels 104 at positions $\lambda_{31}, \lambda_{41}, \lambda_{32}, \lambda_{42}, \lambda_{33}$, and $\lambda_{43}$ respectively. In some aspects, it may be preferred that superpixel 103 comprises a larger-sized mosaic superpixel that is prone to experience more significant undersampling effects with currently available imaging systems, such as for example six pixels in a 2×3 pixel array, or twenty-five pixels in a 5×5 pixel array, or other large mosaic configurations comprising four or more pixels.

Figure 1D:
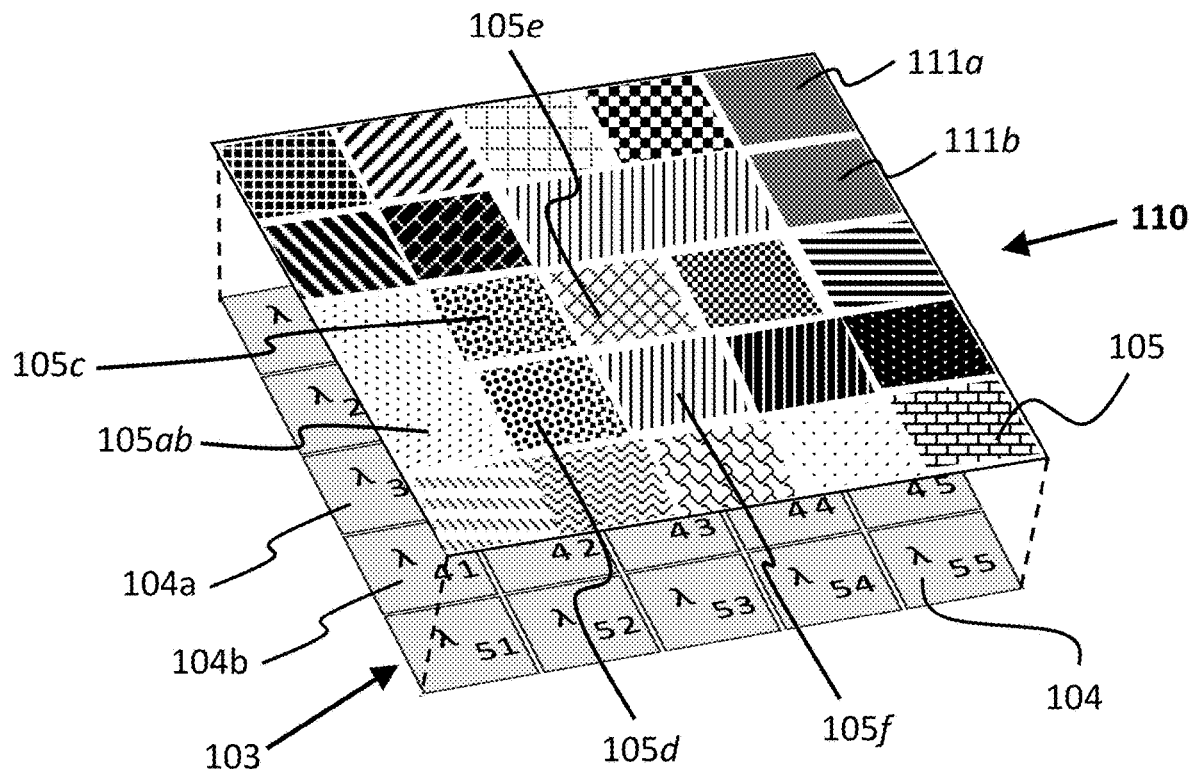

Image sensor 101 further comprises an optical filter array 110 (FIGS. 1A-1B), positioned between each optical homogenizer 106 (106a, 106b in FIG. 1B) and the in-register corresponding different superpixel (103a, 103b, respectively in FIG. 1B). FIG. 1D is an exploded view that schematically depicts a 5×5 optical filter array 110 comprising a plurality of spectral filters 105. (For clarity, spectral filters 105 in optical filter array 110 are shown for one in-register superpixel 103 in FIG. 1A.) At least four spectral filters 105 in the plurality of spectral filters shown in optical filter array 110 are configured to spectrally filter the spatially homogenized EMR 109 differently from one another, as indicated by the different shading patterns for different spectral filters 105 (FIGS. 1D and 1E), and are configured to pass the spectrally filtered, spatially homogenized EMR 109 to the in-register, corresponding different superpixel 103. In embodiments of image sensor 101, each of the at least four pixels 104 in superpixel 103 is in-register with a different one of the at least four differently configured spectral filters 105 and is positioned to receive spectrally filtered, spatially homogenized EMR 109 passed by the in-register spectral filter 105.

Figure 1E:
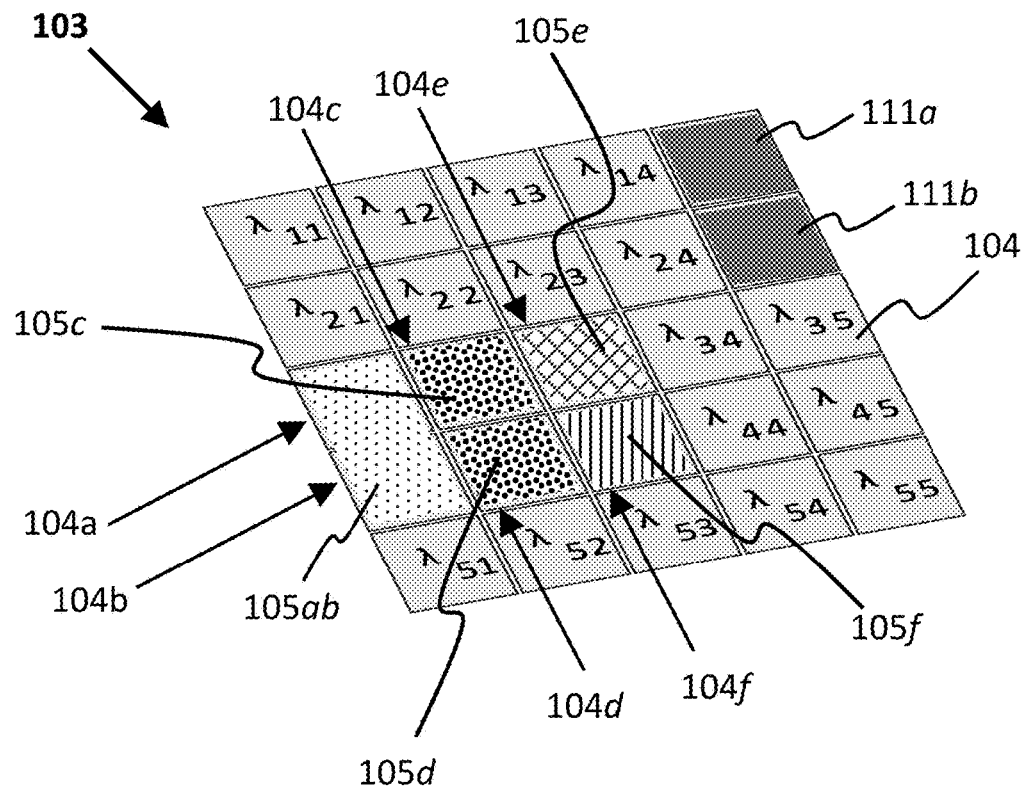

By way of example, referring to FIGS. 1D-1E, the at least four spectral filters 105ab, 105c, 105e, and 105f in the plurality of spectral filters 105 are configured to spectrally filter spatially homogenized EMR 109 differently from one another as represented by different shading patterns for each of those spectral filters. Each of the at least four pixels 104 in superpixel 103, here pixels 104a at 231, 104c at 232, 104e at 233, and 104f at 243, are in-register with a different one of the at least four differently configured spectral filters 105 in optical filter array 110, here the spectral filters 105ab, 105c, 105e, and 105f, respectively. Pixel 104a is in-register with spectral filter 105ab, pixel 104c is in-register with spectral filter 105c, pixel 104e is in-register with spectral filter 105e, and pixel 104f is in-register with spectral filter 105f. In addition, each pixel 104 is positioned to receive spectrally filtered, spatially homogenized EMR 109 passed by the in-register spectral filter 105. For a pixel 104 that is in-register with one of the four differently configured spectral filters 105, it may also be said that the corresponding one of the four differently configured spectral filters 105 is in-register with the corresponding pixel 104. That is for example, pixel 104c is in-register with spectral filter 105c, and spectral filter 105c is in-register with pixel 104c. A pixel 104 and a spectral filter 105 that are in-register with each other may be referred to as "in-register pixel" and "in-register spectral filter" respectively.

A spectral filter 105 in optical filter array 110 may be in-register with one or more than one selected pixels 104 in superpixel 103. In some embodiments, as exemplified in FIGS. 1D and 1E, a single spectral filter 105 in optical filter array 110 may be sized and positioned to pass spectrally filtered, spatially homogenized EMR to two or more pixels 104 in the in-register corresponding superpixel 103. Here, spectral filter 105ab is sized and positioned to pass spectrally filtered, spatially homogenized EMR 109 to pixels 104a and 104b, corresponding to the pixels at positions 231 and 241 respectively, in superpixel 103. In these aspects, spectral filter 105ab is said to be "in-register" with each of the pixels 104a and 104b. Similarly, pixel 104a is in-register with spectral filter 105ab, and pixel 104b is in-register with spectral filter 105ab.

In some embodiments, two different pixels 104 in superpixel 103 may each be in-register with a separate spectral filter 105, wherein the separate spectral filters 105 are configured to have the same spectral filtering characteristics. For example, referring to FIGS. 1D-1E, pixels 104c and 104d at positions 232 and 242 in superpixel 103 are each in-register with a single spectral filter, 105c and 105d respectively. Both spectral filters 105c and 105d are configured to have the same spectral filtering characteristics as indicated by their having the same shading pattern.

In embodiments described herein spectral imager 100 comprises a plurality of baffles 108 (FIGS. 1A-1B), each baffle 108 being configured and positioned to maximize confinement of the spatially homogenized EMR, passed by a single optical homogenizer 106 in the plurality of optical homogenizers to the in-register, corresponding different superpixel 103.

As used herein, "optical filter array" may also be referred to as "array of optical filters", "filter mosaic", or "optical filter mosaic" and refers to the optical filter array 110 positioned between each optical homogenizer 106 and the in-register, corresponding different superpixel 103. In some aspects, optical filter array 110 may comprise one or more different "types" of spectral filters 105, i.e., one or more spectral filters 105 in optical filter array 110 may be based on any of a variety of different technologies, and a filter type may be selected based on the specific application of spectral imager 100, among other considerations. A wide range of spectral filter 105 types and technologies are compatible with embodiments described herein and include, by way of example only, resonant dispersion filters, bandpass filters, metasurface filters, and notch filters, among other filter technologies represent different "types" of filters.

In various embodiments, optical filter array 110 may take any of a variety of configurations, provided that the filter mosaic pattern is contiguous in a superpixel 103 pattern and can be readily tiled. In some embodiments, it may be preferred that pixels 104 in a superpixel 103 be of the same size and shape, but this is not a requirement. In some aspects, it may be advantageous that superpixel array 102 comprises a plurality of superpixels 103, each superpixel 103 having a different configuration, such as for example to accommodate specific optical configurations. By way of example only, a spectral imager 100 that comprises an external optic, such as for example a fisheye lens, may have a plurality of superpixels 103 with some superpixels having a different dimension and/or shape from the other superpixels in the plurality to account for image warp effects.

In some embodiments, one or more spectral filters 105 may also be configured to polarimetrically filter spatially homogenized EMR 109, in addition to spectrally filtering spatially homogenized EMR 109. In some aspects, optical filter array 110 may further comprise one or more polarization filters 111 (e.g., 111a, 111b in FIGS. 1D and 1E) for polarimetric measurements, each polarization filter 111 being configured to polarimetrically filter spatially homogenized EMR 109 and being in-register with one or more than one pixel 104 in a superpixel 103. In some aspects, a polarization filter may also be configured for spectral filtering and, by way of example, may pass selected wavelengths of spatially homogenized EMR 109, while preventing the passage of other wavelengths of spatially homogenized EMR. In some aspects, polarization filter 111 is not spectrally selective and is configured to be panchromatic and pass all or substantially all of spatially homogenized EMR 109. In some embodiments, one or more optical filters in optical filter array 110 may filter spatially homogenized EMR 109 both spectrally and polarimetrically (i.e., spectropolarimetrically) and can produce a spectropolarimetric measurement. In some aspects, a spectral filter 105 and a polarization filter 111 may be configured as separate filters in optical filter array 110 and may both be in-register with the same pixel or pixels 104.

Many different types of spectral filters 105 and filter mosaics may be useful for optical filter array 110, some of which may be commercially available. In some embodiments of spectral imager 100, it may be useful that spectral filters 105 include bandpass filters and/or notch filters. By way of example, one common type of spectral filter 105 mosaic is a square or rectangular pattern of bandpass filters that is repeated across an image sensor 101.

In many embodiments, the quantum efficiency (QE) of a pixel 104 is determined primarily by the configuration of the spectral filter 105 that is in-register with the pixel 104. In some aspects, the QE of a given pixel 104 may be different for different wavelengths of the spectrally filtered, spatially homogenized EMR 109 passed by the in-register spectral filter 105 and incident on the given pixel 104, and the relationship can be viewed as a spectral line shape 201.

Figure 2A:
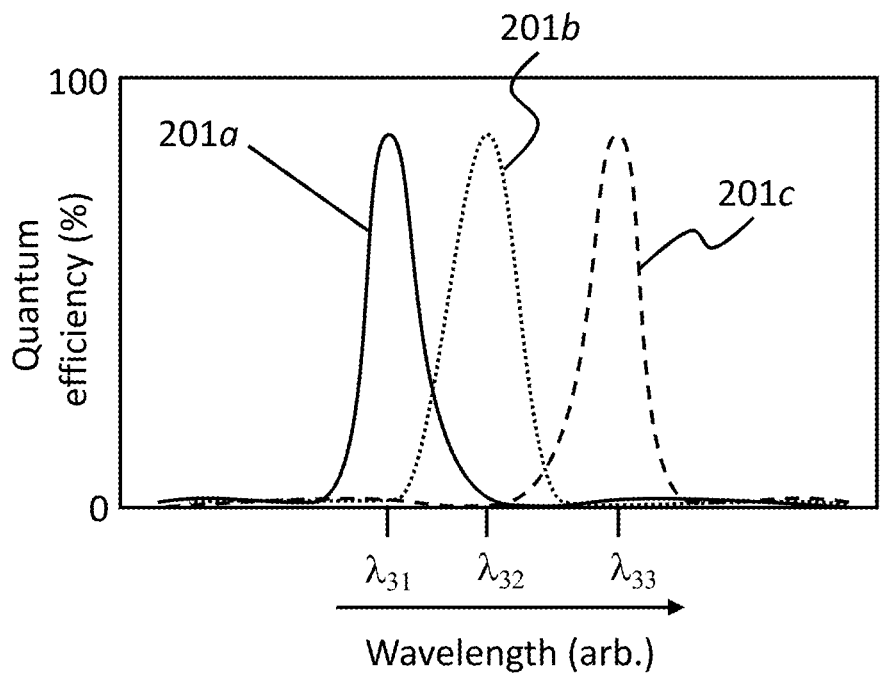
FIGS. 2A-2B illustrate exemplary embodiments of line shapes imparted by spectral filters.
Figure 2B:
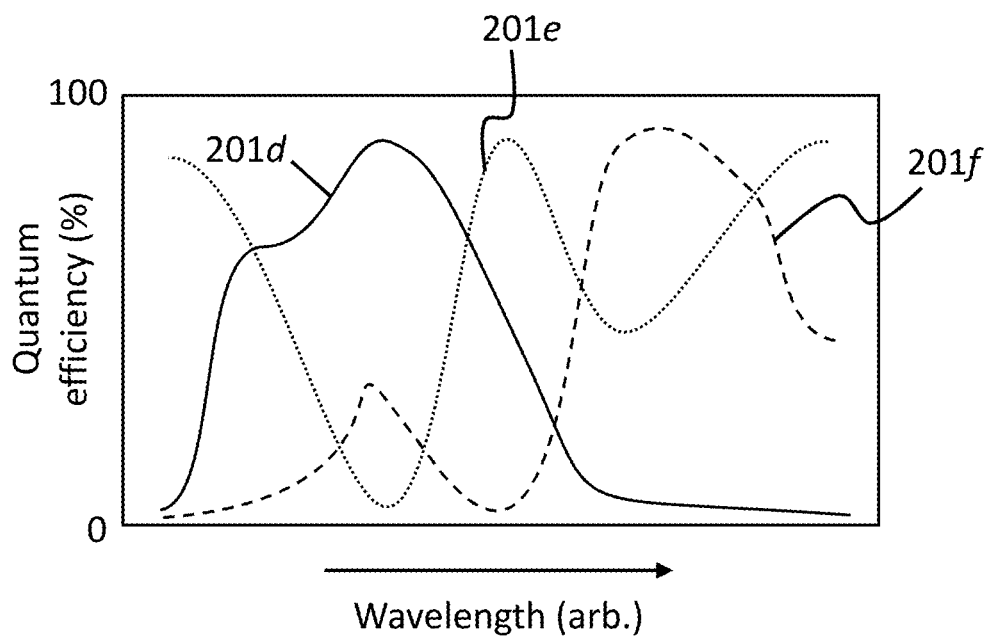

FIGS. 2A-2B illustrate exemplary embodiments of line shapes imparted by spectral filters. Spectral line shapes 201 shown in FIGS. 2A-2B indicate the relative QE of three different pixels 104 for generating an electrical signal from image sensor 101. FIG. 2A shows line shapes 201 for the three different pixels 104, each in-register with a differently configured spectral filter 105. By way of example, line shape 201a indicates the QE (y-axis) of pixel 104a at position 231 of superpixel 103 as a function of wavelength (x-axis); line shape 201b indicates the QE of pixel 104c at position 232 of superpixel 103 as a function of wavelength; and line shape 201c indicates the QE of pixel 104e at position 233 of superpixel 103 as a function of wavelength. In some embodiments, a bandpass spectral filter 105 that passes spatially homogenized EMR 109, centered primarily at a single wavelength, to pixel 104, may result in a line shape 201 similar to those shown in FIG. 2A. In many aspects, image sensor 101 is configured and manufactured such that all pixels 104 in a superpixel 103 will have substantially the same intrinsic electrical response to EMR of a given wavelength that is in the operational spectral band of the spectral imager 100, and any differences in QE among the different pixels 104 would likely result almost entirely from differences in EMR filtering by the spectral filter 105 in-register with a given pixel 104. However in some aspects, image sensor 101 may include variations in QE that are caused by the pixel 104 itself. In general, a pixel's line shape 201 may be regarded as an indication of that pixel's configured sensitivity to various wavelengths of EMR, which is primarily a result of the spectral filter 105 in-register with that pixel 104.

In some embodiments, a spectral line shape 201 for a given pixel 104 may be shaped differently from a line shape 201 imparted by a traditional bandpass spectral filter 105. For example, some types of spectral filters 105, including metasurface spectral filters, may impart a more complex line shape 201 for a given pixel 104, such as the examples shown in FIG. 2B. Line shapes 201d, 201e, and 201f are exemplary complex line shapes 201. Each of these line shapes 201 exhibits variable QEs for a given pixel 204, over a wide range of wavelengths. In some aspects, the use of spectral filters 105 that impart complex line shapes 201 can provide increased EMR throughput.

In some embodiments, spectral imager 100 may be useful for spectral analysis, reconstruction, imaging, and/or deconvolution of EMR 107 that is incident on an optical homogenizer 106 in-register with a corresponding superpixel 103. Numerous computational spectroscopy methods, currently available to a person having ordinary skill in the art, are capable of recovering useful spectra and spectral information from relatively simple line shapes and from complex line shapes. In some aspects, such as for example when different spectral filters 105 impart simple overlapping line shapes 201 on in-register pixels 104 (e.g., as in FIG. 2A) within a single superpixel, simple deconvolution methods known in the art may be employed. However, in some embodiments, complex spectral line shapes 201 such as those in FIG. 2B may necessitate the use of one or more additional steps during spectral reconstruction. Spectral reconstruction methods such as for example minimization (least squares, regularization, non-negative least squares, and other similar methods) may be useful with complex line shapes. Some useful spectral reconstruction methods may be found in Kohlgraf-Owens et al., Optics Lett 35:2236-2237, 2010; Huang et al., Nature Sci Reports 7:40693, 2017; Redding et al., Nature Photonics 7:746-751, 2013; and U.S. Pat. No. 10,254,164 each of which is incorporated by reference herein in its entirety.

In many embodiments, spectral imager 100 comprises a plurality 113 of optical homogenizers 106, each optical homogenizer 106 being in-register with a corresponding different superpixel 103 in superpixel array 102, being positioned to receive incident EMR 107, and being configured to spatially homogenize the received EMR 107 and to pass the spatially homogenized EMR 109 to the in-register, corresponding different superpixel 103.

As used herein, "spatially homogenize EMR" means to homogenize the spatial intensity distribution of received incident EMR 107 without regard for the wavelength of the EMR. Optical homogenizers 106 are typically configured to produce equivalent results for EMR of any wavelength within an operational spectral band. In many aspects, the goal of spatial homogenization is to minimize the importance of the spatial location and/or wavelength of EMR on the subsequent illumination of superpixel 103. In other words, in many aspects, a key objective of optical homogenizer 106 is to make EMR that is incident on the superpixel substantially invariant to spatial incident location or spectral content.

In many embodiments, optical homogenizers 106 are separated from one another by baffles 108, each baffle being configured and positioned to maximize confinement of the spatially homogenized EMR 109 passed by a single optical homogenizer 106 to the in-register, corresponding different superpixel 103. Maximizing confinement of the spatially homogenized EMR 109 to the in-register, corresponding different superpixel 103 may serve to prevent spreading of spatially homogenized EMR 109 to one or more neighboring superpixels thereby suppressing or eliminating crosstalk with neighboring superpixels 103. In many embodiments, optical homogenizers 106 and baffles 108 are configured to produce a spatially uniform pattern of homogenized EMR 109, regardless of where incident EMR 107 is received on optical homogenizer 106.

Optical homogenizers 106 effect homogenization of the spatial intensity distribution of received EMR 107. In some embodiments, optical homogenizers 106 cause EMR to spread diffusively during spatial homogenization. Optical homogenizers 106 may be configured to employ any of a variety of means for spatially homogenizing incident EMR 107. The terms "optical homogenizer" and "homogenizer" may be used interchangeably herein to refer to optical homogenizer 106. In many embodiments, optical homogenizers 106 may comprise "diffusive media", also referred to herein as "optical diffusers" and/or "diffusers" 301. In some aspects, optical homogenizer 106 may be configured as a "volume homogenizer" or as a "surface homogenizer", and diffusers 301 for use with such homogenizers may be referred to as "volume diffusers" or as "surface diffusers", respectively. In some aspects, optical homogenizer 106 may comprise both a volume homogenizer and a surface homogenizer. An optical homogenizer 106 that is a "surface homogenizer" may have some thickness, but in many aspects, the optical homogenizer thickness 309 of a surface homogenizer is typically of comparable dimension to the center wavelength of EMR in the operational spectral band of spectral imager 100. By way of example, in some aspects a useful thickness 309 for a surface homogenizer may be about ten times (10×) the center wavelength of the operational spectral band or shorter. In some embodiments, a useful thickness 309 for optical homogenizer 106 that is a volume homogenizer is typically larger than the center wavelength of the operational spectral band of spectral imager 100, (FIGS. 3B-3C), such as about ten times (10×) the center wavelength of the operational spectral band or larger.

As used herein, the "operational spectral band" of a spectral imager is the range of wavelengths, including a minimum wavelength and a maximum wavelength, over which spectral imager 100 is configured to operate. As described herein, image sensor 101 comprises a superpixel array 102 having a plurality of superpixels 103, each superpixel 103 comprising at least four pixels 104. Each of the at least four pixels 104 is in-register with a different one of at least four differently configured spectral filters 105, that are configured to spectrally filter spatially homogenized electromagnetic radiation 109 differently from one another. The differently configured spectral filters 105 are selected to spectrally filter different wavelengths or wavelength ranges of EMR within the operational spectral band of spectral imager 100. The center wavelength of EMR in the operational spectral band is the wavelength that is halfway between the minimum wavelength and the maximum wavelength of EMR in the operational spectral band. In some aspects, the selected operational spectral band of spectral imager 100 may be determined by the filtering characteristics of the at least four spectral filters 105. In some aspects, the selected operational spectral band of spectral imager 100 may be determined by band-cutoff filters that may be positioned in fore-optics for example, or by insufficient detector quantum efficiency outside of the selected operational spectral band, or by any combination of these factors.

Figure 3A:
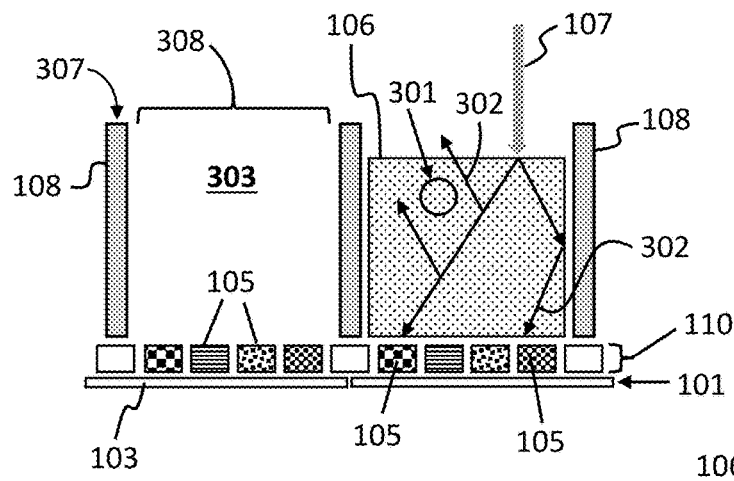
FIGS. 3A-3C are schematic cross-sectional, side views of exemplary embodiments of a spectral imager.
Figure 3B:
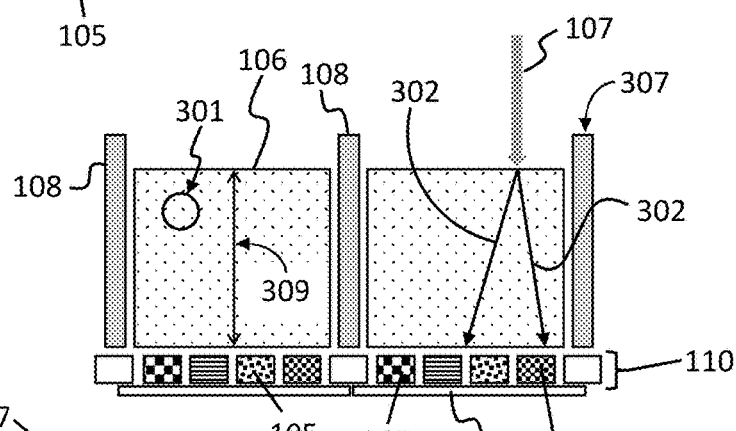
Figure 3C:
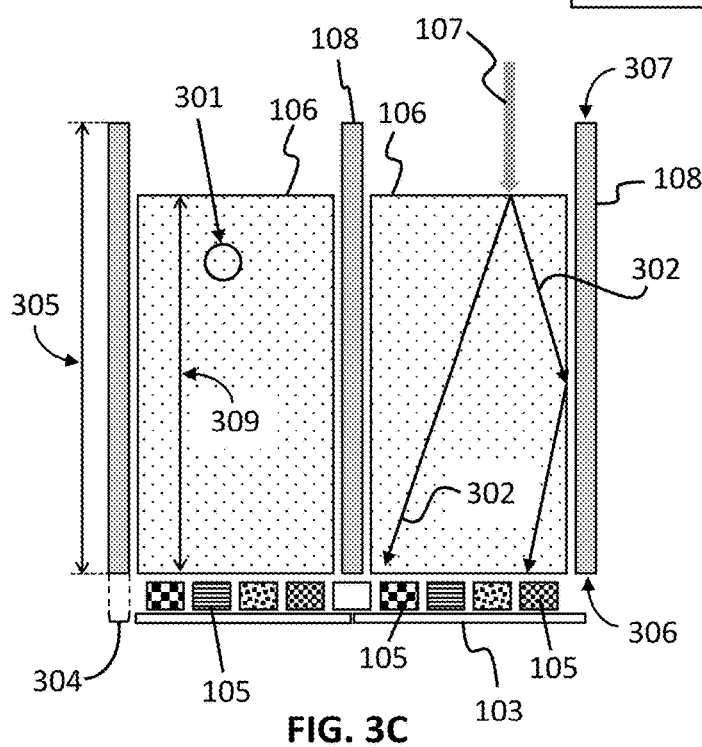

In some embodiments, optical homogenizer 106 comprising diffusers 301 may be positioned within void 303 defined by baffle 108, as depicted in FIG. 3A and in FIGS. 1A-1B. FIGS. 3A-3C are schematic, cross-sectional side views of exemplary embodiments in which optical homogenizer 106 comprises diffusers 301 and is positioned within void 303 defined by baffle 108. (To clearly depict void 303, optical homogenizer 106 is not shown at the left side in FIG. 3A.) Selected dimensions of baffle 108 are indicated in FIG. 3C. In some embodiments, as used herein baffle wall height 305 refers to the distance between lower edge 306 and upper edge 307 of baffle 108, and baffle wall width 304 refers to the side-to-side thickness of a baffle wall. In many embodiments, baffle wall width 304 is typically measured at baffle lower edge 306, near or at the surface of image sensor 101 or optical filter array 110. As used herein, baffle upper edge 307 refers to the edge of baffle 108 that is distal to optical filter array 110, and baffle lower edge 306 refers to the edge that is proximal to optical filter array 110.

In some aspects, optical homogenizers 106 having the exemplary configurations shown in FIGS. 3A-3C may be useful for effecting a relatively high degree of spatial homogenization of received incident EMR 107. In some embodiments, it may be preferable to homogenize EMR over a relatively shorter distance. The exemplary embodiments of spectral imager 100 shown in FIGS. 3A-3B have a relatively shorter baffle wall height 305. In these aspects, optical homogenizer 106 is configured as a volume homogenizer and is relatively thinner (i.e., has a smaller thickness 309) than in the embodiment shown in FIG. 3C. In many aspects, optical homogenizer 106 with a smaller thickness 309 may benefit from a reduction in mean free path of EMR during spatial homogenization when compared to an optical homogenizer 106 having a larger thickness 309 and may be useful for spatially homogenizing EMR over relatively shorter distances. In these aspects, more strongly scattering diffusers 301 (i.e., diffusers 301 causing strong, forward diffusion of EMR rays 302) may effectively homogenize EMR prior to EMR rays 302 reaching optical filter array 110. In some aspects, strongly scattering diffusers 301 may produce undesirable, backscattered EMR (upward pointing EMR rays 302 in FIG. 3A). Undesirable backscatter may be reduced by using an optical homogenizer 106 that comprises more weakly scattering diffusers 301 (FIG. 3B). In some aspects however, weakly scattering diffusers 301 may not provide adequate spatial homogenization of received incident radiation 107. In some embodiments, an optical homogenizer 106 having a relatively larger thickness 309 and comprising more weakly scattering diffusers 301 may be a useful configuration for providing adequate spatial homogenization of EMR with the additional benefit of increasing EMR throughput. In general, the mean free path, the composition, scattering strength, and density of diffuser 301, the optical homogenizer thickness 309, the optical homogenizer configuration (e.g., volume vs. surface homogenizers), the dimensions of baffle 108 (e.g., baffle height 305 and baffle width 304), and other element parameters discussed below in more detail may be adjusted to meet the requirements of a particular spectral imager 100.

Diffusers 301 that may be useful for spatially homogenizing EMR are known to those having ordinary skill in the art. In some embodiments, diffusers 301 may be particles loaded into a polymer, porous structures, lithographically defined structures, inhomogeneous polymers or bulk materials, or other structures known in the art to be useful for causing diffusive spread of EMR. In some embodiments, it may be preferred that diffusive spread of EMR rays 302 be wavelength-independent across a spectral band of interest and/or be non-attenuating. However, in some aspects, the aforementioned criteria are not all required.

The exemplary embodiments of optical homogenizers 106 shown in FIGS. 3A-3C are volume homogenizers and the diffusers 301 used in those embodiments may be referred to as volume diffusers. Exemplary methods for making an optical homogenizer 106 that is a volume homogenizer include depositing diffusers 301 in void 303 to at least partially fill void 303. In some aspects, such a method may include depositing dielectric particles in void 303, and in some embodiments subsequently infiltrating the dielectric particle matrix with another dielectric material, such as by way of example only, infiltrating $SiO_2$ into an $Al_2O_3$ particle matrix using atomic layer deposition. In some aspects, one or more methods may include producing an inhomogeneous gel and depositing the gel in void 303 to serve as diffusers 301; depositing colloidal solutions of dielectrics for use as diffusers 301 that can cure or solidify in void 303; and/or forming polymer diffusers 301 by suspending colloidal polymers in a second polymeric media, that may be integrated into void 303, wherein the colloid may subsequently be removed by a gas process, liquid process, or plasma process to produce an optically inhomogeneous diffuser material. In some aspects, one or more methods may include depositing diffusers 301 present in liquid crystal/polymer composites wherein the liquid crystals are dispersed in a polymer matrix. Exemplary methods that may be useful include those found in Zhou et al., RSC Adv. 8:40347, 2018 and in Zhou et al., Liquid Crystals 47:(5) 785-798, 2020, each of which is incorporated by reference herein in its entirety. In one exemplary method, void 303 may be overfilled with diffusers 301 followed by subtractive removal of the diffusers 301 to a desired level using a polish, mechanical wipe, doctor blade, ablation, etch, or similar process. In some aspects, diffusers 301 may be removed to a desired level that is substantially at baffle upper edge 307. In many embodiments, void 303 need not be completely filled with diffusers 301, and in some embodiments may be partially filled with diffusers 301.

Figure 9:
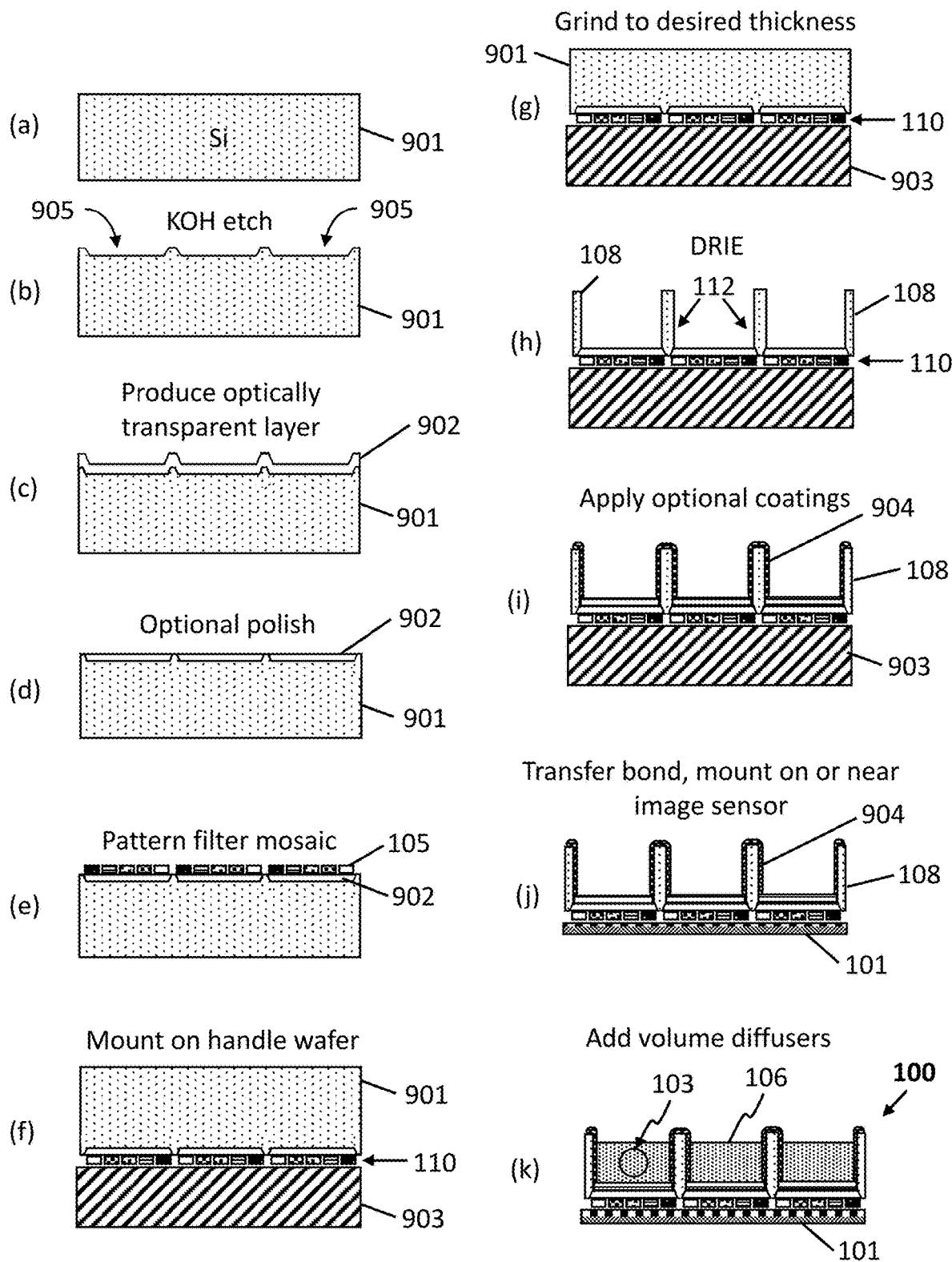
FIG. 9 shows an exemplary embodiment for fabricating an embodiment with integrated optical filters.

In some embodiments, void 303 defined by baffle 108 is not an enclosed volume. That is, void 303 is defined by baffle 108, but baffle 108 may remain open at a location distal to optical filter array 110 by way of baffle opening 308 at baffle upper edge 307 and/or baffle 108 may remain open at baffle lower edge 306 (FIG. 3C) at a location that is proximal to optical filter array 110. The spectral imager 100 embodiments shown in FIGS. 3A-3C are examples in which baffle 108 is open at baffle upper edge 307 via baffle opening 308 and at baffle lower edge 306. In some embodiments, baffle 108 may be closed at one or both of baffle upper edge 307 and baffle lower edge 306. By way of example, optical homogenizer 106 and/or another optically transparent structure may be configured and positioned so as to effectively close baffle opening 308. In some aspects, an optically transparent structure may be positioned at the bottom of void 303 that serves to essentially close baffle 108 at baffle lower edge 306. Such a structure may be fabricated using, by way of example only, a method that comprises performing deep reactive ion etching to an etch stop as is shown in FIG. 9. In some aspects, positioning baffle 108 to be in contact with optical filter array 110 or image sensor 101 may be used to close baffle 108 at bottom edge 306.

In some embodiments, spatial homogenization of received incident EMR 107 may be tailored to limit the angles of incidence of spatially homogenized EMR 109 rays 302 at optical filter array 110. However, useful limitations on the angles of incidence of EMR rays 302 at optical array 110 may vary among spectral imager 100 embodiments and may depend at least partially on manufacturing strategies and spectral purity requirements for the spectral imager application. To adjust and control the angles of incidence at optical filter array 110 of spatially homogenized EMR rays 302, one or more of several strategies may be useful, and may include for example, providing an external optic such as a field lens; employing one or more than one external optic such as an array 1002 of microlenses 1003 that are in registration with the plurality of optical homogenizers for converting a ray bundle incident from a primary external optic to a configuration more conducive to spectroscopy (e.g., converting the ray bundle to a more telecentric configuration); incorporating one or more field stops to limit the effective f-number, such as for example only, by incorporating an array of micro-field stops at the position where incident EMR 107 enters optical homogenizer 106; adjusting baffle wall height 305; adjusting homogenizer thickness 309; and/or adjusting scattering strength of diffusers 301, among other methods.

Exemplary materials useful in forming diffusers 301 for use with some selected spectral bands of EMR include, but are not limited to, most optical polymers, glasses, and oxides for use with EMR in the visible (VIS) band; most optical glasses and oxides for use with EMR in the shortwave infrared (SWIR) band; silicon, germanium, chalcogenide glasses, most optical-grade salts and fluorides, oxides including for example $TiO_2$, and standard MWIR optics for use with EMR in the midwave infrared (MWIR) band; and germanium, chalcogenide glasses, salts such as for example KBr, NaCl, and fluorides including $BaF_2$, and other standard LWIR optical materials for use with EMR in the longwave infrared (LWIR) band. Diffusers 301 for diffusing EMR 107 may be prepared on a substrate or purchased as substrates and may be subsequently textured or otherwise prepared according to known methods.

In some embodiments, diffusers 301 may be in contact with baffle inner surface 112, such as for example when optical homogenizer 106 completely fills void 303. In some aspects, optical homogenizer 106 may be or may comprise at least part of inner surface 112 of a baffle 108. By way of example, referring to FIG. 1A, optical homogenizers 106c and 106d comprise baffle inner surface 112 having deposited diffusers 301 in the case of 106c and being a textured surface 112 as in the case of 106d. In some aspects, some, all, or substantially all of baffle inner surface 112 may be configured to cause or enhance spatial homogenization of received EMR 107. For example only, some, all, or substantially all of baffle inner surface 112 may be smooth metal, may have surface imperfections, may be textured or roughened, and/or may have diffusers 301 deposited thereon (e.g., coating 904 that may include particles or other diffusive media). In some embodiments, optical homogenizer 106 may comprise at least one of a surface homogenizer, a volume homogenizer, or baffle inner surface 112 configured to cause or enhance spatial homogenization of received EMR 107. In some aspects, optical homogenizer 106 may comprise any combination of a surface homogenizer, a volume homogenizer, or baffle inner surface 112 configured to cause or enhance spatial homogenization of received EMR 107.

Figure 11:
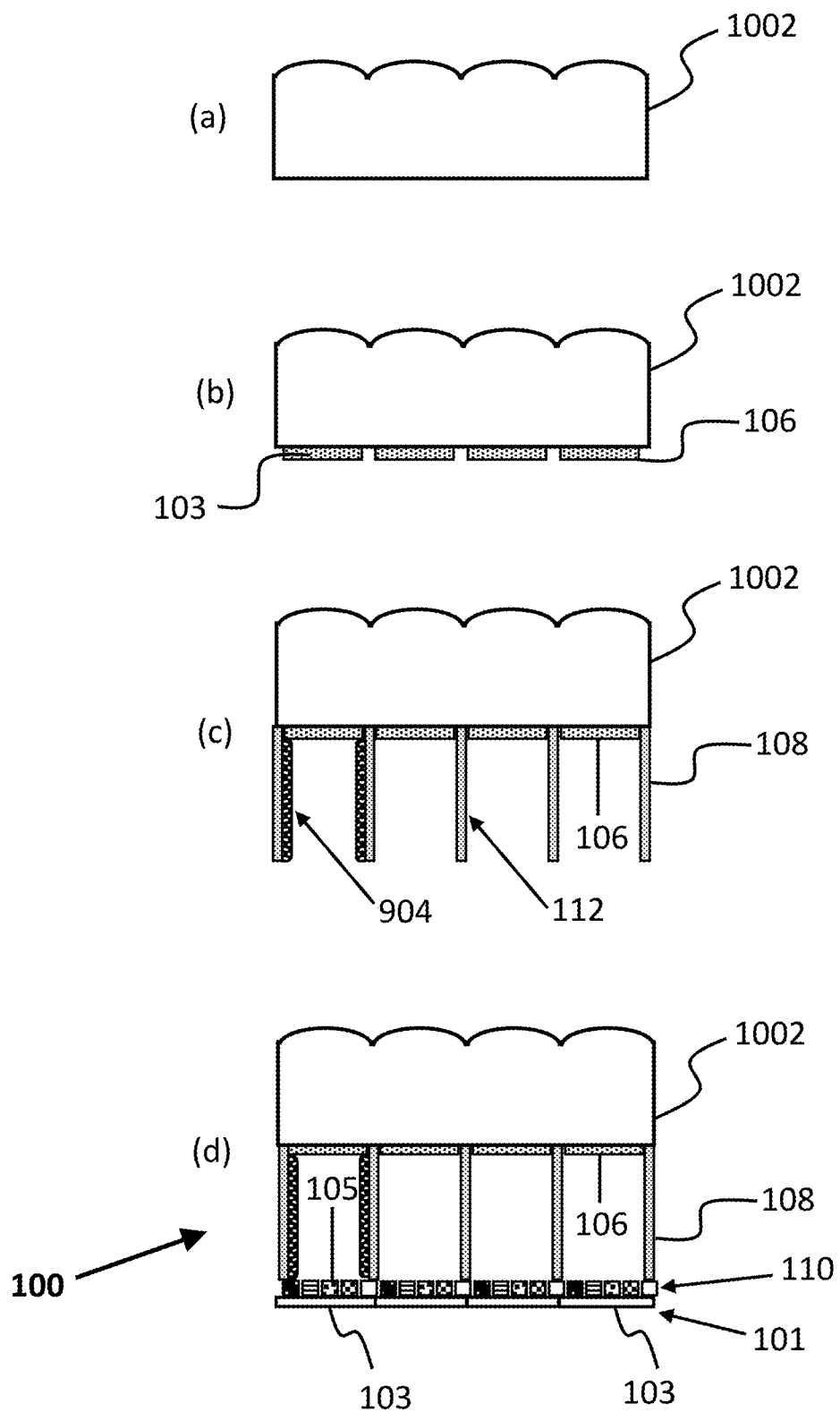
FIG. 11 shows an exemplary embodiment for fabricating a spectral imager having integrated homogenizers and microlenses.
Figure 13:
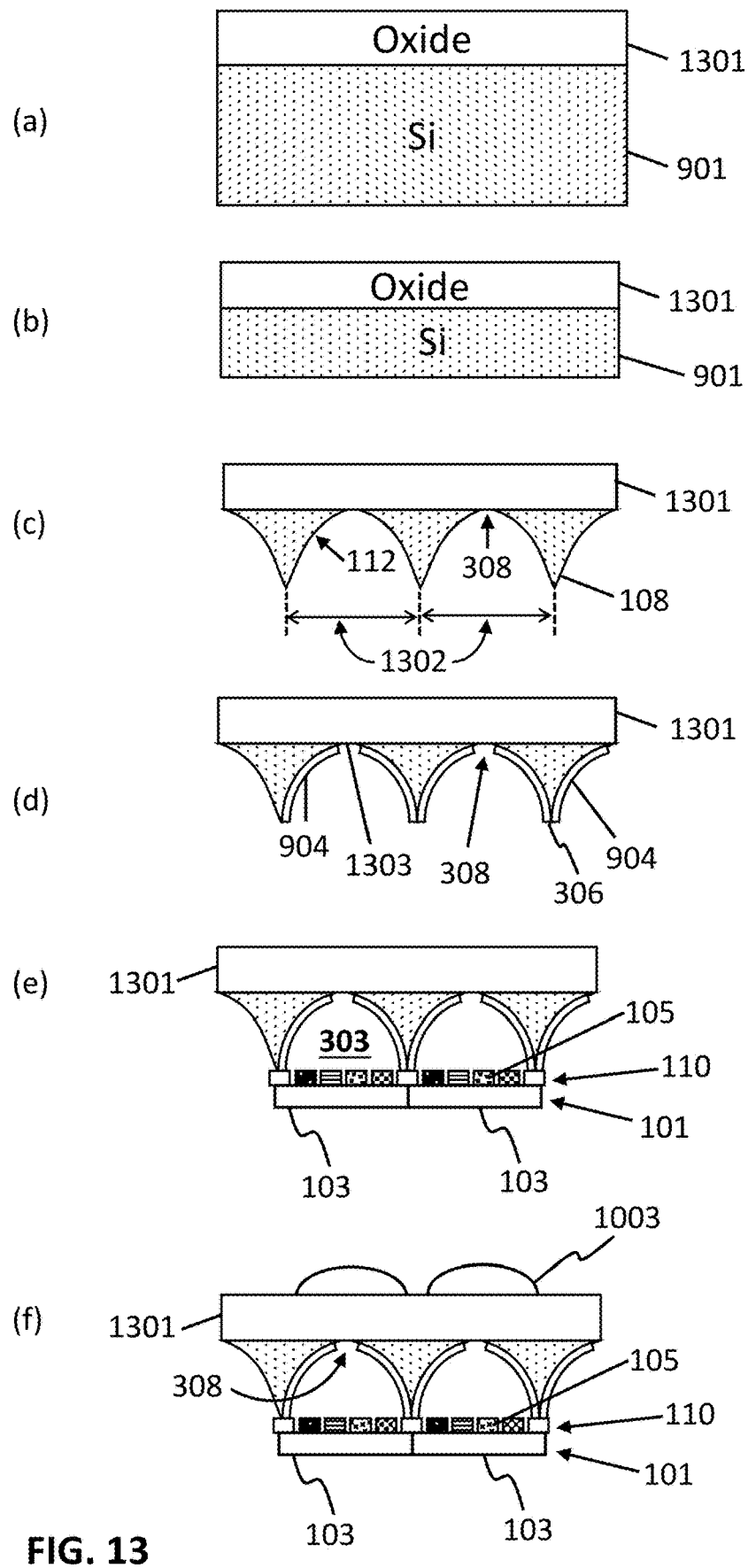
FIG. 13 depicts an exemplary embodiment for fabricating a spectral imager comprising dome-shaped baffles.

Baffles 108 may be manufactured using any of a variety of methods known to a person having ordinary skill in the art including, by way of example only, electroplating into a resist template, etching trenches into a substrate and subsequently filling the trenches with baffle media, thermoforming a polymer, imprinting, and/or deep reactive ion etching through a substrate, such as for example a silicon substrate. Some exemplary methods are shown in FIGS. 9, 11, and 13. In many embodiments baffles 108 are configured and positioned to maximize confinement of homogenized EMR 109 to the in-register, corresponding different superpixel 103, while remaining compatible with requirements of the spectral imager 100 application. In some embodiments, baffle lower edge 306 may be positioned at any of a variety of locations in relation to the surface of image sensor 101 or the surface of optical filter array 110. By way of example, in some embodiments, baffle lower edge 306 may be positioned at the surface of image sensor 101, at the surface of optical filter array 110 (FIG. 7C), or at a "standoff" position located at a selected "standoff" distance from the surface of image sensor 101 or from the surface of optical filter array 110 (FIGS. 3A-3C). In some spectral imager 100 embodiments, one or more than one baffles 108 may have baffle lower edge 306 positioned at the surface of image sensor 101, one or more than one baffles 108 may have baffle lower edge 306 positioned at the surface of optical filter array 110, and one or more than one baffles may have baffle lower edge 306 located at a selected standoff distance from the surface of image sensor 101 or from the surface of optical filter array 110. In some aspects, the positions of baffles 108 and baffle lower edge 306 may be selected based on manufacturing limitations, manufacturing considerations (e.g., pixel acceptance angles, sensor substrate thickness), and/or the likely effectiveness of the positioning for maximizing confinement of homogenized EMR 109 to the in-register, corresponding different superpixel 103. In many embodiments, the structure and composition of optical homogenizers 106, the types and structures of diffusers 301, baffle wall height 305, baffle wall width 304, and/or image sensor pixel utilization requirements may be considered in determining placement of baffles 108 and positioning of baffle lower edges 306.

In some embodiments, spectral imager 100 operability and/or manufacturing requirements may necessitate that one or more walls of baffle 108 be positioned such that one or more pixels 104 in superpixel 103 are partially or completely blocked by a baffle wall from receiving homogenized EMR 109. In some aspects, one or more baffle 108 wall may block one or more rows or columns of pixels 104 in one or more superpixel 103 from receiving homogenized EMR 109. In some aspects, this may be an acceptable loss of pixel utilization, and a spectral imager 100 may be configured with a pixel readout strategy that can ignore sensor data from the one or more blocked rows and/or columns of pixels so as to limit data bandwidth and power consumption. In general, the ability to implement this strategy will be dependent on spectral imager 100 design and programmability and flexibility of the readout circuitry (e.g., the modifiability of image sensor 101 by a field-programmable gate array, FPGA).

Figure 4:
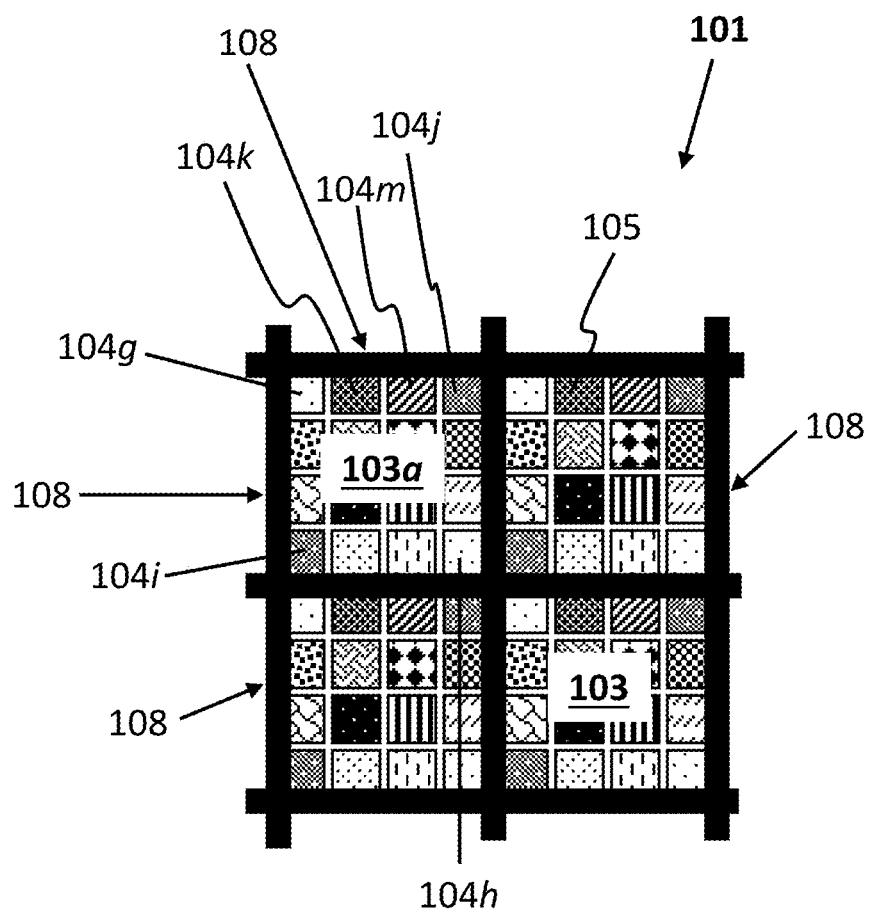
FIG. 4 shows a top-down, schematic view of an exemplary embodiment of a superpixel array and baffle configuration.

In some embodiments, one or more baffle 108 walls may partially block one or more pixels 104, located at an edge of superpixel 103 and/or at a corner of superpixel 103, from receiving homogenized EMR 109. FIG. 4 is a top-down, schematic view of an exemplary image sensor 101 having a 2×2 array of superpixels 103, each superpixel 103 having a 4×4 array of pixels 104. In this example, each pixel 104 in each superpixel 103 is in-register with a single corresponding spectral filter 105 positioned over the in-register pixel 104. For superpixel 103a, corner pixels 104g, 104h, 104i, and 104j are positioned beneath a corresponding, in-register spectral filter, 105g, 105h, 105i, and 105j respectively, where each combination of pixel 104 and in-register corresponding spectral filter 105 is represented, for ease of viewing, by a patterned square labeled with the number of the pixel, e.g. 104g, 104h, 104i, 104j, that is positioned beneath the in-register corresponding spectral filter 105. In this exemplary embodiment, pixels 104k and 104m located at an edge of superpixel 103 are blocked along one edge of pixel 104 by baffle 108 wall. Corner pixels 104g, 104h, 104i, and 104j are each partially blocked by baffle 108 walls along two edges of the pixel 104. The footprint of baffle bottom edges 306 is represented as thick black lines. It is to be noted that in many embodiments baffle bottom edges 306 form a footprint that is rectangular or square in shape. However, in some aspects, baffle bottom edges 306 may form a footprint that is circular or elliptical, randomly shaped, or having another geometrical shape.

In some embodiments, baffle 108 wall configuration and pixel utilization strategies may be applied to mitigate possible negative effects associated with baffle 108 walls that partially block pixels 104. For example in some aspects, a spectral filter 105 for use with a corner pixel 104 or with a pixel 104 at an edge of superpixel 103, can be selected and configured so that the filter passes spatially homogenized EMR 109 having the highest anticipated irradiance. In many embodiments, an entire superpixel 103 is operated at the same gain or exposure, and such a configuration may be useful for reducing or balancing the dynamic range of the electrical signals produced in image sensor 101 in each superpixel 103. By way of example, a selected spectral filter 105 may pass spatially homogenized EMR 109 that is substantially panchromatic or that substantially spans the solar maximum, whereas an interior spectral filter 105 (i.e., a spectral filter 105 in-register with a pixel 104 that is not occluded by a baffle 108, such as pixel 104 that is not a corner pixel 104 or a pixel 104 at an edge of superpixel 103) may substantially pass spatially homogenized EMR 109 that spans a region with lower anticipated irradiance or detector quantum efficiency, such as a near-infrared band for a CMOS sensor. In some embodiments, selected spectral filters 105 may be duplicated at some pixel 104 locations on superpixel 103 to provide a duplicate measurement of received EMR 109 having the same line shape 201.

In some aspects for mitigating negative effects of baffle 108 walls blocking pixels 104, spectral filters 105 positioned over one or more than one partially blocked pixels (e.g., 104g and 104h; 104i and 104j) may be configured to impart the same spectral line shapes 201 on those pixels. As shown in FIG. 4, pixels 104g and 104h are represented with the same pattern to indicate that the in-register corresponding spectral filters 105 (i.e., 105g and 105h respectively) are configured to have the same filtering capability and impart the same line shape. In a similar manner, the patterned squares representing pixels 104i and 104j indicate that the in-register corresponding spectral filters 105 (i.e., 105i and 105j respectively) are configured to have the same filtering capability and impart the same line shape. As such, for the example shown in FIG. 4, the 16 pixels 104 in superpixel 103a provide spectral measurements of EMR passed by 14 different types of spectral filters. In some aspects, duplicating spectral filters 105 at corner pixel positions in a superpixel 103 may be useful when irradiance of corner pixels 104 is reduced by caustics or other light non-uniformities that may arise from homogenization of EMR 107. Duplication of spectral filters 105 at corner pixels 104 in superpixel 103 results in a reduced percentage of pixel utilization when compared with pixel utilization for a superpixel 103 that does not have duplicated spectral filters 105. By way of example, for a superpixel 103 having a 3×3 array of pixels 104 with no duplicated filters 105, 100% of pixels will receive spatially homogenized EMR 109 that has been filtered differently. Whereas, for a superpixel 103 having a 3×3 array of pixels 104 with four corner pixels partially blocked and two pairs of duplicated spectral filters (e.g., 105g/105h and 105i/105j), ~77.8% of pixels 104 will receive spatially homogenized EMR 109 that has been filtered differently. For a superpixel 103 having a 5×5 array of pixels 104 with four corner pixels partially blocked and two pairs of duplicated spectral filters, ~92% of pixels 104 will receive spatially homogenized EMR 109 that has been filtered differently.

Figure 5:
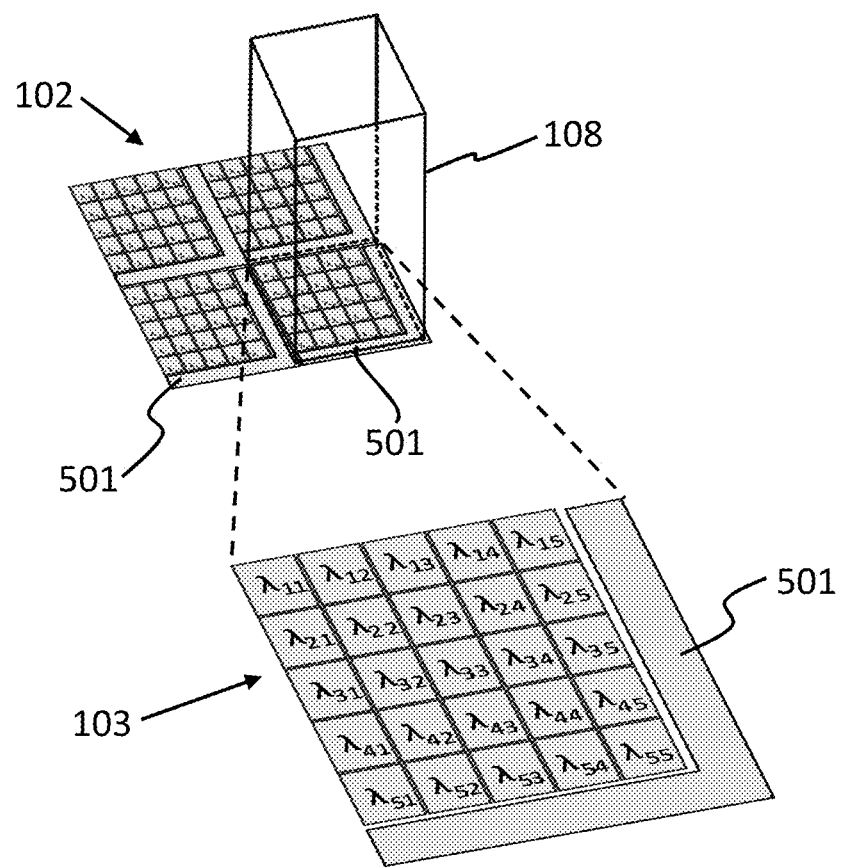
FIG. 5 is a schematic view of an exemplary embodiment of a superpixel and baffle configuration.

Various strategies may be implemented for increasing pixel utilization when one or more pixels 104 in superpixel 103 are partially or completely blocked by a baffle 108 wall from receiving homogenized EMR 109. Useful embodiments for increasing pixel utilization may often depend on pixel size, baffle material and fabrication strategy, and/or baffle integration strategy to name some factors. In some embodiments, to prevent baffle 108 walls from blocking pixels 104, image sensor 100 may be configured to have ROIC processing elements, readout electronics 501, or other non-photodetecting electronic circuit elements located in a region that may be blocked by one or more baffle 108 walls. FIG. 5 shows a schematic view of an exemplary embodiment of a superpixel and baffle configuration. In this embodiment, baffle 108 walls may be positioned above readout electronics 501 to prevent blocking of sensor pixels 104. In some aspects, readout electronics 501 may also be configured to enable specialized operations such as superpixel-level gain or exposure control.

In some embodiments, baffle wall width 304 may be considerably smaller than a pixel 104. By way of example, baffle wall width 304 may be less than or equal to about ¼ of the pixel pitch 1402. In these embodiments, baffle 108 walls may be positioned between superpixels 103 and may block less spatially homogenized, filtered EMR 109 from being received by a pixel 104 when compared with a configuration having a larger baffle wall width 304. In some aspects, by way of example only, baffle 108 walls that are positioned between superpixels 103 may block less than or equal to about $\frac{1}{8}^{th}$ of spatially homogenized EMR 109 passed to edge pixels 104 and less than or equal to about $\frac{1}{4}^{th}$ of spatially homogenized EMR 109 passed to corner pixels 104. If deemed useful, the aforementioned mitigation and dynamic range balancing strategies may also be applied in these situations.

In some embodiments, spectral imager 100 may be configured such that one or more superpixel 103 has independent gain and/or exposure controls. For example, an electrical circuit may be configured for reducing the gain of or shortening the exposure time of superpixel 103 that may become saturated before other superpixels 103 in image sensor 101.

Figure 6:
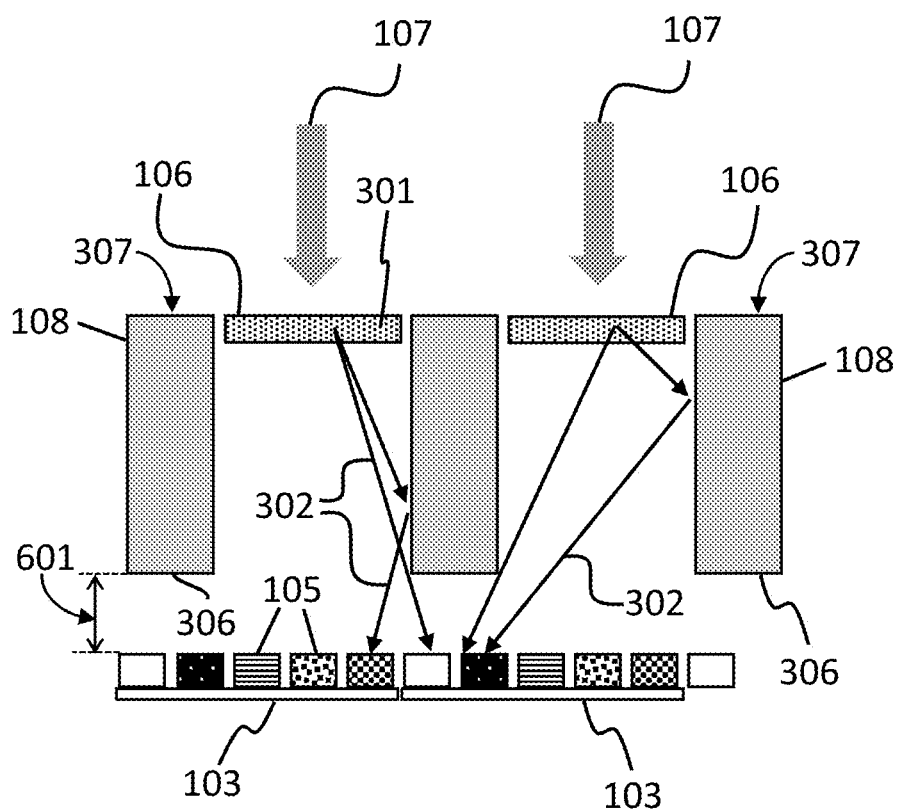
FIG. 6 is a schematic cross-sectional, side view of an exemplary embodiment of a spectral imager having a surface homogenizer.

In some embodiments, baffle wall width 304 may be relatively larger. For example, baffle wall width 304 may be about the same size as or larger than pixel 104. FIG. 6 is a cross sectional, schematic side view of an exemplary embodiment of spectral imager 100 that may be useful for increasing pixel 104 utilization when baffle wall width 304 is relatively large. In this embodiment, baffles 108 may be positioned such that baffle lower edges 306 are located at a standoff distance 601 from spectral filters 105. This embodiment may be useful for pixels 104 configured to have an acceptance angle commensurate with the angles of EMR rays 302 arriving from the corners of the homogenizer 106. For these aspects, the geometry of EMR ray 302 propagation, baffle 108 position, and baffle scattering properties can be readily modeled and elements designed using standard ray tracing programs available to a person having ordinary skill in the art. In these embodiments, the aforementioned strategy of employing duplicated spectral filters 105 at corner pixels 104 and/or modifying the shape of baffle opening 308 may be useful for increasing pixel utilization. The geometry of baffle opening 308 may also be modeled and designed using standard ray tracing tools. In the exemplary embodiment shown in FIG. 6, baffles 108 are positioned to suppress crosstalk with neighboring superpixels 103 by functioning as a field stop at baffle lower edges 306.

In some embodiments, positioning baffle lower edges 306 at a standoff distance 601 from image sensor 101 and/or spectral filters 105 may be useful for maximizing pixel utilization with configurations having pixels 104 that are positioned behind a substrate or cover glass or having pixels 104 that cannot be physically contacted by baffle 108 due to surface treatments or fragility concerns.

In some embodiments, volume optical homogenizers 106 for use with some spectral bands of EMR (e.g., the UV or IR bands) may be more challenging to manufacture than surface optical homogenizers 106, and surface optical homogenizers 106 may be a more practical option for manufacturing some spectral imagers 100. In some aspects then, optical homogenizer 106 may be or may comprise a surface homogenizer rather than a volume homogenizer. FIGS. 6, 7A-7C, and 8A-8B show exemplary embodiments of spectral imager 100 comprising optical homogenizers 106 that are surface homogenizers. In many embodiments, optical homogenizer 106 that is a surface homogenizer may be positioned at or near baffle upper edge 307 as in the exemplary embodiments shown in FIGS. 6, 7A-7C, and 8A-8B. Surface optical homogenizers 106 can be useful for reducing large ray angles at the image sensor 101 surface. Surface optical homogenizer 106 may be prepared by methods known in the art such as for example surface etching additive methods and/or deposition methods and may comprise diffusers 301 that are particle films (e.g., a film comprising $Al_2O_3$ or $TiO_2$ particles), various lithographically defined patterns including metasurface structures, and/or other diffusive media. In many aspects a surface optical homogenizer 106 may comprise the same types of diffusers 301 as does a volume optical homogenizer 106 and may be manufactured in the same manner as a volume optical homogenizer 106. In some aspects, a surface optical homogenizer 106 can be prepared separately from baffles 108. For example, in some embodiments a contiguous layer of diffusive media may be prepared separately from baffles 108 and may be located or positioned over a plurality of superpixels 103, as shown for the exemplary embodiment in FIG. 8B. In some embodiments then, such as in FIG. 8B, optical homogenizer 106 that is in-register with a corresponding different superpixel 103 may be or may comprise a region of a larger contiguous layer of diffusive media. As such, optical homogenizer 106 that is a region of a contiguous layer of diffusive media is the region of that contiguous layer that is configured to spatially homogenize incident EMR 107 and positioned to pass spatially homogenized EMR 109 to optical filter array 110. There may be regions of the same contiguous layer of diffusive media that do not substantially pass spatially homogenized EMR 109 to optical array 110, such as the regions that are located above baffle 108 walls that are not positioned over void 303, and therefore these regions are not optical homogenizers.

Figure 7A:
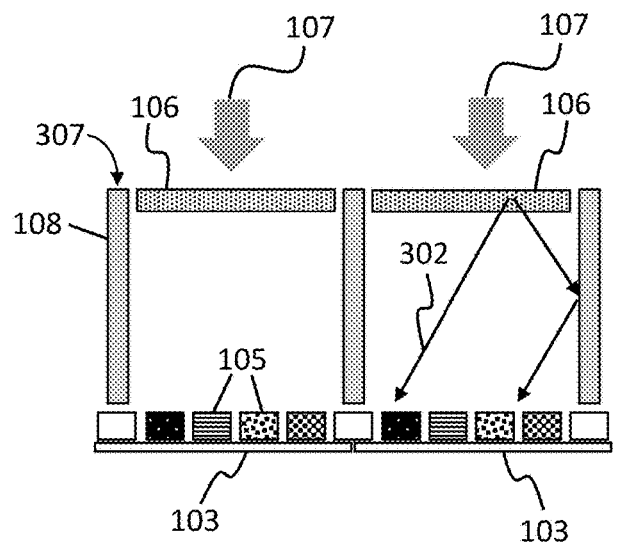
FIGS. 7A-7C are schematic cross-sectional, side views of exemplary embodiments of a spectral imager having a surface homogenizer.
Figure 7B:
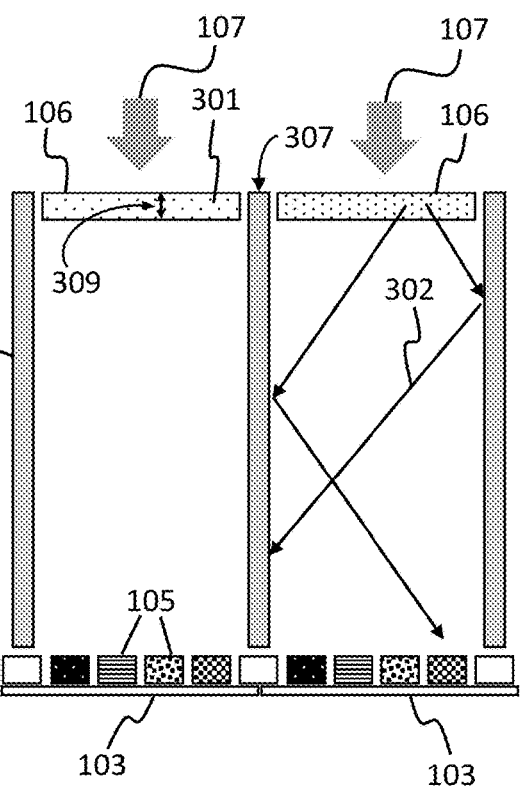
Figure 7C:
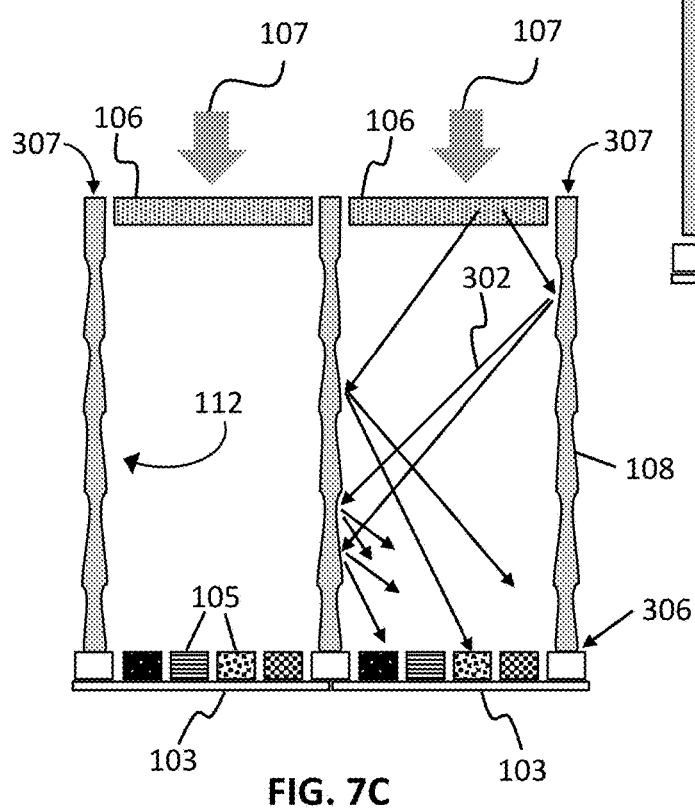

In some embodiments, baffle 108 having a relatively taller baffle wall height 305 and having a surface homogenizer 106 positioned at or near baffle upper edge 307 may function as a light pipe homogenizer (FIGS. 7B and 7C). In some embodiments, a surface homogenizer 106 may comprise a diffractive element, a micro-optical element such as for example a vortex plate, an optical metasurface, and/or a thin film of particles. In some aspects it may be preferable that spectral imager 100 be configured to direct incident EMR 107 to arrive at a skew angle resulting in rays 302 that are skew rays, which are directed by optical homogenizer 106 toward image sensor 101. In some aspects, this can be achieved by configuring spectral imager 100 to have additional micro-optical elements or an off-axis field lens in the imaging system.

As used herein the term "baffle inner surface" 112 refers to the "interior" surface of a baffle 108 wall, that is, the surface of baffle 108 that faces void 303. In some embodiments, as used herein, the term "baffle inner surface" 112 may include any region of one or more than one baffle inner surface 112, and a region of baffle inner surface 112 may take any shape or have any dimensions up to substantially all or all of the interior surface of baffle 108. In some aspects, a baffle cross section that is taken parallel to the plane of image sensor 101 may be any size, shape, or configuration that is useful for confining spatially homogenized radiation 109 passed by each optical homogenizer 106 to the in-register, corresponding different superpixel 103 or any shape or configuration that is useful for spatially homogenizing EMR 107 or contributing to the spatial homogenization of EMR 107. By way of example useful cross-sectional shapes of baffle 108 include square, rectangular, circular, elliptical, or a random geometrical shape. In some aspects, a baffle cross section taken at a first distance from image sensor 101 may have a different shape and/or size when compared with a baffle cross section taken at a second distance from image sensor 101 or when compared with a baffle footprint at baffle bottom edge 306. By way of example only, a dome-shaped or hemispherical baffle 108 may have a rectangular cross section near or at baffle bottom edge 306 and an elliptical or circular cross section at a position more distal to the surface of image sensor 101, as for the exemplary embodiment in FIGS. 12A and 12B.

In various embodiments, the term "baffle inner surface" 112 may refer to any region of an interior surface up to and including all interior surfaces of baffle 108. For example, for a baffle cross section that is rectangular, "baffle inner surface" 112 may refer to one interior side of baffle 108 up to all four interior sides of baffle 108, or any portions thereof. In some aspects baffle bottom edges 306 may form any useful shape such as for example, square, rectangular, circular, elliptical, or random geometrical shape, and a shape formed by baffle bottom edges 306 may differ from the shape of a baffle cross section taken at any selected distance from baffle bottom edges 306 distal to image sensor 101.

In some embodiments, at least a part of baffle inner surface 112 may be configured to be textured, i.e., one or more regions of baffle inner surface 112, or all of baffle inner surface 112 may have surface texture such as the example shown in FIG. 7C. For example, baffle inner surface 112 may be configured as a roughened, faceted, or otherwise-textured surface, such as for example only a wavy surface, so as to enhance spatial homogenization of incident EMR 107. In some aspects, baffle 108 may have surface texture along or substantially along the entire length of baffle inner surface 112, i.e., from baffle upper edge 307 to baffle lower edge 306. In some aspects, baffle 108 may have surface texture positioned at discrete locations of baffle inner surface 112. Methods for texturing and roughening light-pipe homogenizers are known to a person having ordinary skill in the art and can be useful here with baffles 108. A baffle 108 having a roughened inner surface 112 may cause ray 302 angles to increase as EMR is spatially homogenized and passed to image sensor 101. In these aspects, it may be preferred that baffle lower edge 306 be positioned as closely as possible to the in-register, corresponding superpixel 103 as is the case in FIG. 7C.

Figure 8A:
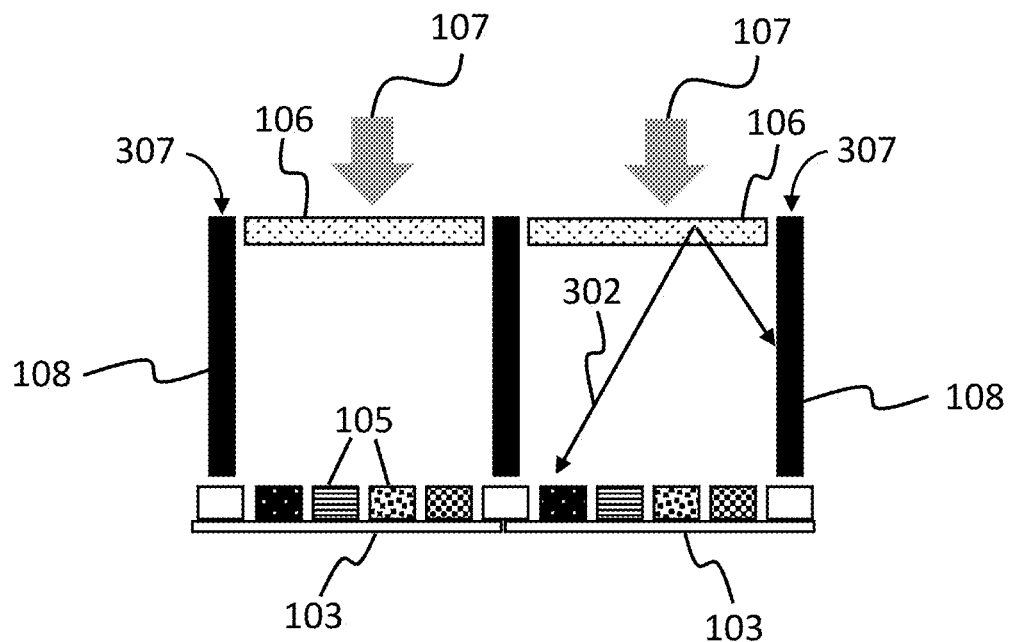
FIGS. 8A-8B are schematic cross-sectional, side views of exemplary embodiments of a spectral imager having a surface homogenizer.
Figure 8B:
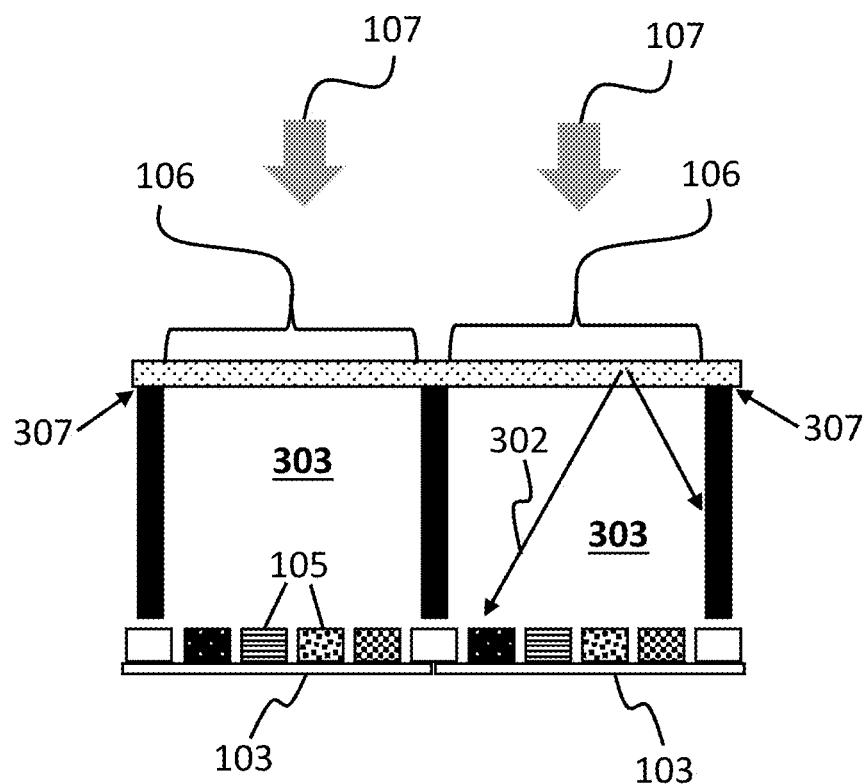

In some embodiments, all or part of baffle inner surface 112 may be reflective, which may promote EMR throughput. However in some aspects, baffle inner surface 112 may be configured to absorb at least some EMR during spatial homogenization of incident EMR 107, which in some aspects can reduce caustics that may result from reflection of EMR rays 302. FIGS. 8A-8B show exemplary embodiments of spectral imager 100 comprising baffles 108 configured to have absorbing baffle inner surface 112 that absorbs EMR rays 302.

In some embodiments, spectral filters 105 may be integrated with optical homogenizers 106 and with image sensor 101. In some aspects, optical filter array 110 comprising metasurface spectral filters 105 may be fabricated on a transmissive substrate that is integrated with baffles 108 having reflective baffle inner surfaces 112. The resulting structure may then be added to an image sensor 101 using for example wafer bonding, die bonding, an external support frame, or other techniques known in the art for integrating micro-optical elements. One exemplary embodiment for fabricating a spectral imager 100 with an integrated optical filter array 110 is shown in FIG. 9. In this embodiment, at (a) substrate 901, such as a silicon substrate, is provided. In some aspects and in accord with the application of spectral imager 100, an electroplating step may be required during fabrication (in this example, step (i) could be an electroplating step), and as such it may be preferable that the silicon substrate be heavily doped. Optionally at (b) a KOH etch may be performed where each etch pit 905 defines the location of a superpixel 103. At (c) an optically transparent layer 902 with an etch stop is produced. For example, optically transparent layer 902 may comprise an oxide that can be grown (wet or dry based on a required thickness) that may function as a transmissive support membrane. For use as a structural transmissive support membrane, the thickness of optically transparent layer 902 may be selected to account for optical transmission requirements. In general, it is preferable that the thickness of a transmissive support membrane is selected so as to prevent destructive interference modes that can reduce EMR throughput within the operational spectral band. Structural properties may also be considered during fabrication, such as for example the ability of optically transparent layer 902 functioning as a transmissive support membrane to withstand physical stresses so as to prevent failure during release or other processing steps. In some aspects, optically transparent layer 902 may comprise, by way of example, silicon dioxide, non-silicon oxides, nitrides, oxynitrides, and other materials having useful optical, structural, and material properties for a specific spectral imager application. In some aspects, it may be preferred that material selected for optically transparent layer 902 be optimized for use with a selected spectral band of interest. For example, for a spectral imager 100 designed for use in the MWIR region of the EM spectrum, silicon may be preferred for use as optically transparent layer 902, whereas silicon dioxide would function as an EMR-absorbing material. In these aspects, a Silicon on Insulator (SOI) wafer may be useful, where the oxide (e.g., $SiO_2$) serves as an etch stop, and is subsequently removed with an HF cleaning step. In some aspects, although $SiO_2$ is transparent when used with EMR in the VIS and SWIR bands, it may be useful to perform an oxide strip step so as to remove residue from the deep reactive ion etching (DRIE) process. In such aspects, materials such as silicon nitride and silicon oxynitride may be preferred as optically transparent layer 902 functioning as a transmissive support membrane. In some aspects, such as with a spectral imager 100 for use in the LWIR band of the EM spectrum, germanium may be preferred as optically transparent layer 902 that will serve as a transmissive support membrane and can be processed using a Germanium on Insulator (GOI) wafer. In some aspects, such as with a spectral imager 100 for use in the UV through MWIR bands of the EM spectrum, a Sapphire on Silicon (SOS) wafer may be useful for preparing optically transparent layer 902 that will serve as a transmissive support membrane.

In some embodiments, optically transparent layer 902 produced in (c) may optionally be polished as in (d), which in some aspects may expose a portion of the underlying substrate 901. Optional polishing (d) may be useful, for example when subsequent steps require a planar surface (such as for nanoimprint lithography), and a silicon substrate 901 can act as an optical barrier to prevent unwanted light from scattering within the oxide layer between adjacent superpixels 103. In some embodiments, it may be useful to have support structure protrude beyond the surfaces of the optical filter so as to prevent optical filter material (in optical filter array 110) including spectral filter 105 material from being in contact with image sensor 101 during integration step (j). The inclusion of polishing step (d) will typically depend on specific requirements for integration.

Step (e) in this exemplary method, patterning a spectral filter 105 mosaic, can vary depending on the composition of spectral filters 105. By way of example only, in addition to spectral filters 105, optical filter array 110 may further comprise one or more than one of interference filters, plasmonic filters, dielectric metasurfaces, dyes, and/or bulk deposited materials, any of which may require specific considerations for patterning or for different patterning methods. At step (f) in this exemplary fabrication process, the spectral filter 105 mosaic and optical filter array 110 are protected and the wafer is mounted onto a handle wafer 903. Typically, substrate 901, here the silicon wafer, is then ground and polished as in (g) to the desired final thickness. At (h), using anisotropic etching, such as for example DRIE, substrate 901 (silicon wafer) is then patterned and etched down to the oxide etch stop produced in (c), forming baffles 108. Coatings 904 may then optionally be applied, as desired (i). Exemplary coating 904 may include metallization of the silicon side walls, that serve as baffle inner surfaces 112, so as to promote or suppress reflection of EMR during spatial homogenization. By way of example only, electroplating baffle inner surfaces 112 with silver (Ag) or gold (Au) may be useful for making baffle inner surface 112 that promote reflection. In some embodiments for making baffle inner surface 112 that promote reflection, other useful materials may comprise multilayer dielectric coatings and/or aluminum (Al). Electroplating baffle inner surface 112 with Cu followed by an oxidizing step to blacken the Cu coating may be useful for making a baffle inner surface 112 that is EMR-absorbing. In some aspects, an EMR-absorbing baffle inner surface 112 comprises CuO. Various other carbon-containing treatments (e.g., porous graphitic and carbon nanotube structures), motheye treatments, and chrome may be useful as EMR-absorbing coatings. Other coatings and modifications for promoting reflection of EMR or for enhancing EMR absorption by baffle inner surfaces 112 are commercially available or otherwise known to one of skill in the art.

In some aspects, high-angle deposition may be useful for coating a baffle inner surface 112, to prevent inadvertently coating a transmissive support membrane (optically transparent layer 902). In some embodiments, antireflective material layers, such as by way of example a quarter-wave $MgF_2$ layer, may be applied to the transmissive support membrane (optically transparent layer 902). Following the application of optional coatings 904 to baffle inner surfaces 112, at (j) the formed structure shown in (i) may then be transferred to another support structure, such as a second handle wafer, and in some aspects, may be diced prior to this step. At this point, the formed structure may then be mounted near or integrated with image sensor 101. In some embodiments step (j) may be performed after step (k) depending on processing and tooling requirements. At (k) diffusive media such as volume diffusers 301 are added to enhance the spatial homogenization of incident EMR 107. In some aspects, additional optional diffusive media 301 may include scattering membranes and/or more complex micro-optical structures such as external optics like microlenses 1003 in a plenoptic configuration that may be designed to re-image the entrance pupil onto the integrated optical homogenizer 106. In general, embodiments of spectral imager 100 will require a calibration step after manufacture, as is typical for other spectral filter mosaic technologies.

The steps in FIG. 9 illustrate one exemplary method for making an exemplary embodiment of spectral imager 100 having an integrated optical filter array 110. It is not a requirement that all steps be performed in the order shown. One skilled in the art of micro-fabrication of spectral imaging components will understand that some intermediate steps, such as for example lithographic processing, are not explicitly shown. Some embodiments of spectral imager 100 may have alternative configurations that require different or additional methods of fabrication. By way of example only, in some embodiments, optical homogenizers 106 may comprise one or more than one of a surface homogenizer, a volume homogenizer, or a textured baffle inner surface 112, or any combination of these.

Figure 10:
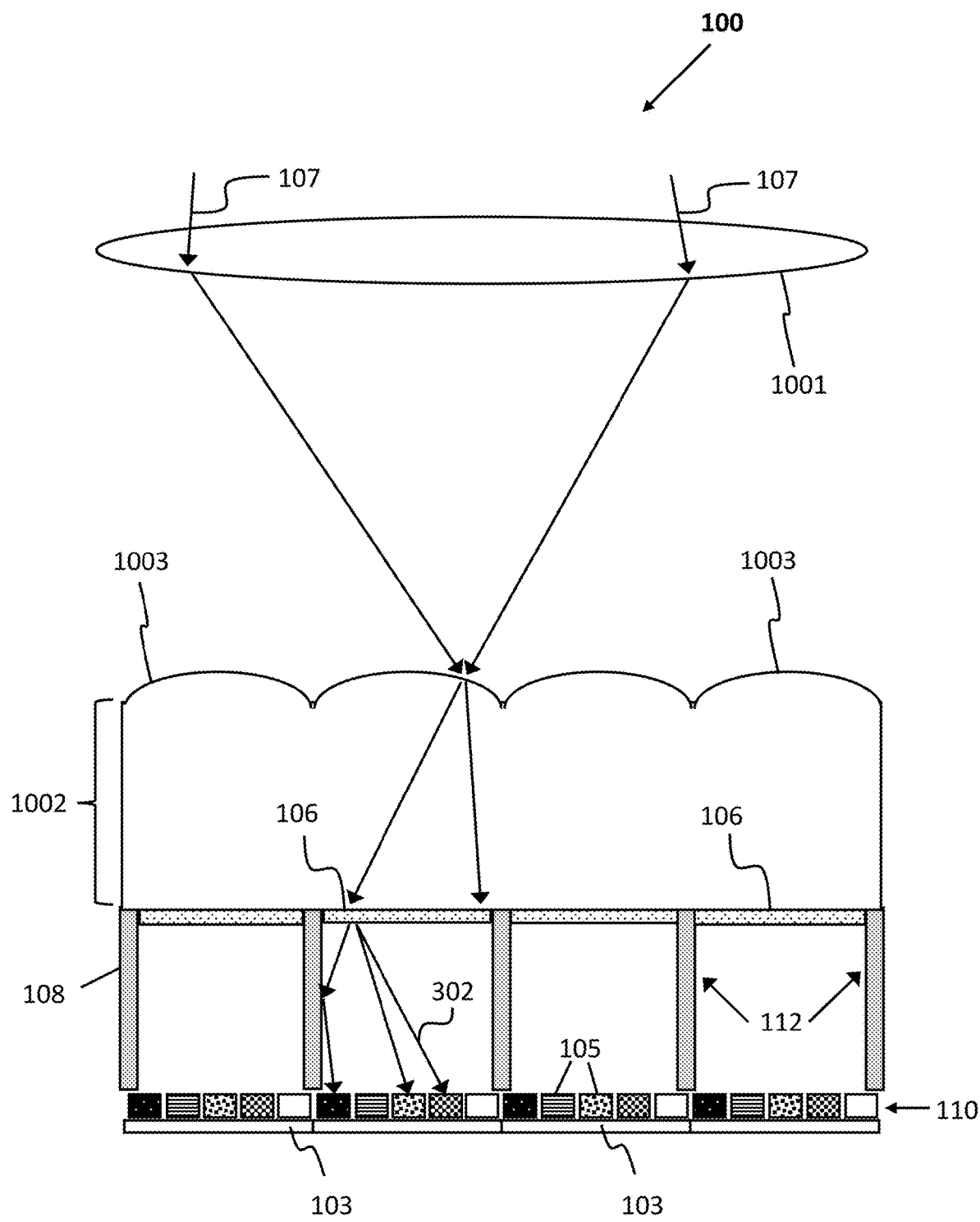
FIG. 10 is a schematic cross-sectional, side view of an exemplary embodiment of a spectral imager comprising selected external optical elements.

In some embodiments, spectral imager 100 may comprise external optical elements, such as by way of example only, one or more objective lens 1001 and/or one or more microlenses 1003, which may be present in a microlens array 1002. In some aspects, spectral imager 100 may comprise a camera or an imaging optic. In some aspects, additional optical elements may be external to baffle 108 and positioned between baffle 108 and incident EMR 107. In some aspects, one or more microlenses 1003 may be useful for contributing to the spatial homogenization of incident EMR 107 in addition to the spatial homogenization effected by optical homogenizer 106. FIG. 10 is a schematic cross-sectional, side view of an exemplary embodiment of a spectral imager 100 that comprises external objective lens 1001 and microlens array 1002 having a plurality of microlenses 1003, wherein objective lens 1001 is positioned to receive incident EMR 107 and to pass incident EMR 107 to microlens array 1002 from which the EMR is passed to optical homogenizer 106. In some embodiments, each microlens 1003 in microlens array 1002 may be positioned to be in-register with a corresponding different optical homogenizer 106, such that the radiation passed to the corresponding different optical homogenizer 106 is then spatially homogenized and passed to the in-register, corresponding different superpixel 103. In some aspects, to reduce crosstalk between superpixels 103, it may be beneficial that the one or more microlens 1003 be faster than objective lens 1001. Baffles 108 are typically configured to also reduce crosstalk (i.e., to maximize confinement of spatially homogenized EMR 109 to corresponding different superpixel 103) and in some aspects, may be configured to provide additional spatial homogenization function. In this exemplary embodiment, optical homogenizers 106 are depicted as surface homogenizers, but may also be volume homogenizers. Useful types of surface and volume homogenizers 106 have been described previously herein.

FIG. 11 depicts one exemplary method for manufacturing spectral imager 100 that comprises external microlens array 1002 integrated with optical homogenizers 106. In this exemplary embodiment, at (a) microlens array 1002 is provided and may be manufactured to have selected specifications. In some aspects, commercially available microlens arrays 1002 may also be used. At (b), optical homogenizers 106, here surface homogenizers, are added to the side of microlens array 1002 facing imager sensor 101. In some aspects, additional diffusive media 301 may be added to optical homogenizers 106 as is useful according to the application of spectral imager 100. At step (c), baffles 108 are added. Baffles 108 may be produced by electroplating into a template or may be added by integrating a prefabricated array of baffles 108, or by other means known to one of skill in the art. One or more baffle inner surfaces 112 of selected baffles 108 may be treated so as to have a coating 904, such as a reflective coating. The optional treatment of baffles 108 to apply coating 904 may depend on the treatment and/or baffle 108 manufacturing strategy and may be performed before or after the addition of baffles 108 to the structure. In this exemplary embodiment at (d), the microlens array 1002/optical homogenizer 106/baffle 108 assembly is integrated with an image sensor 101, which has already been configured to include an optical filter array 110.

In some embodiments, spectral imager 100 may be useful for spatially homogenizing incident EMR 107 from a variety of spectral bands including EMR having wavelengths in the UV band through the LWIR band. In many aspects, optical materials for use with a given spectral imager 100 embodiment may be selected to accommodate the spectral band of interest. By way of example, in some aspects transmissive optical materials, reflective materials, and absorbing materials may be selected so as to be transmissive, reflecting, or absorbing, respectively, over the spectral band of interest for a given spectral imager 100 embodiment. Specific materials useful for transmission, refraction, reflection, and absorption in various spectral sub-bands from the UV through LWIR spectral band are well-described in the art and are known to persons having ordinary skill in the art. It is to be noted that for some image sensor 101 embodiments designed for use with longer EMR wavelengths, the wavelengths of incident EMR 107 may be dimensionally similar to one or more dimensions of the micro-optical elements of spectral imager 100. In such cases, it may be useful that some structural elements be modeled with more comprehensive electromagnetic modeling schemes, rather than with simple ray tracing.

Figure 12A:
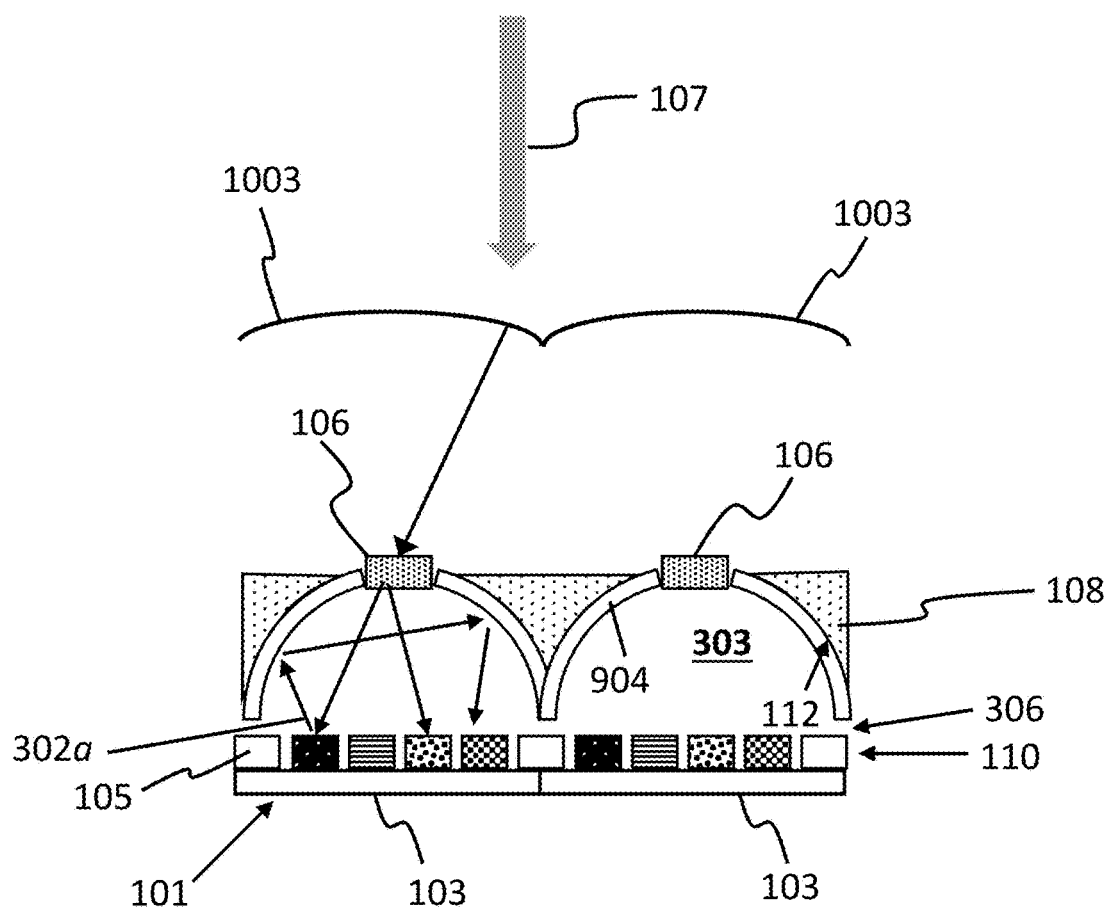
FIGS. 12A-12B show views of an exemplary embodiment of a spectral imager having a dome-shaped baffle.
Figure 12B:
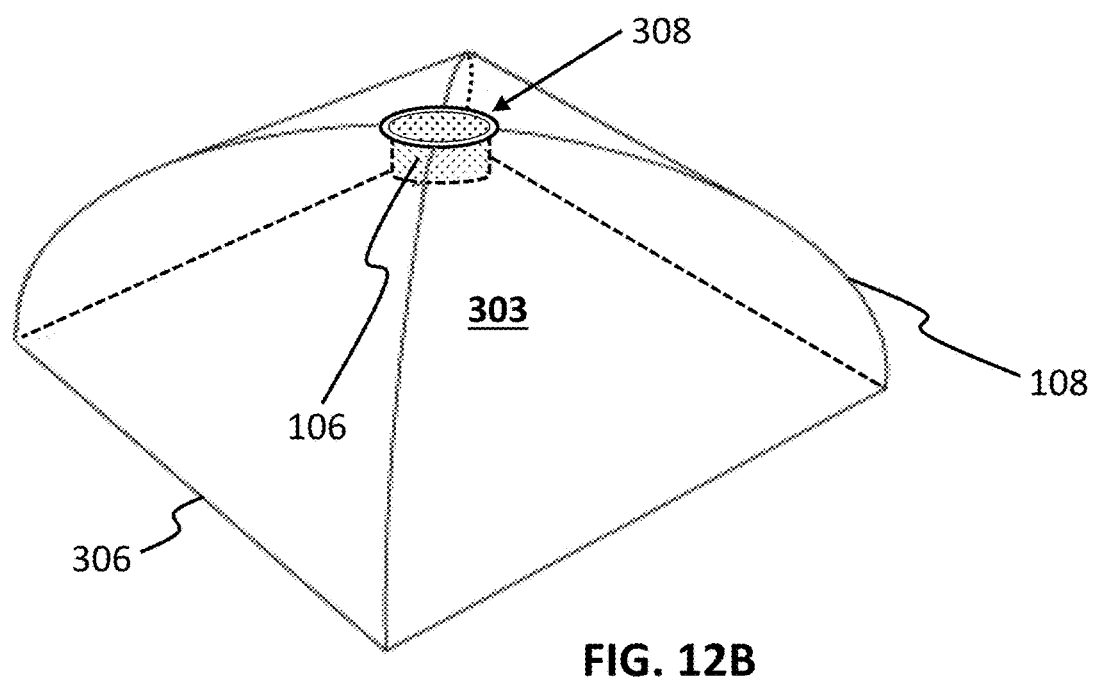

In some embodiments, for example when baffle 108 defines a dome-shaped void 303 as in FIGS. 12A-12B, structural elements (e.g., baffle 108) may be best modeled as a leaky cavity if the structural element's characteristic dimensions approach less than or equal to about two times (2×) the longest wavelength of incident EMR 107 in a spectral sub-band of interest. In these aspects, it may also be important to consider the impedance matching conditions of the structural elements. For example, the minimum width of any apertures or constrictions included in the structural element should not be less than half the wavelength of the longest wavelength of EMR to be detected (λmax/2), or else EMR rejection may be unacceptably high.

In some configurations, such as the exemplary embodiment shown in FIGS. 12A-12B, spectral imager 100 may be configured to cause backscatter of at least some EMR rays 302 during the spatial homogenization process, which may function to "recycle" at least some EMR through the homogenization process one or more times and in some aspects may improve the efficiency of spatial homogenization of incident EMR 107. FIG. 12A shows a schematic cross sectional, side view of an exemplary embodiment of spectral imager 100, that may be useful for enhancing specular reflection of EMR rays 302 (e.g., 302a) so as to recycle EMR through the spatial homogenization process. In some aspects, spectral filters 105 may be configured to reject all out-of-band EMR, reflecting the EMR specularly. In many aspects, specularly reflected EMR rays (302a) may be directed to a different region of superpixel 103, where reflected EMR rays 302 may interact with a spectral filter 105 that can pass the reflected EMR to an underlying pixel 104 on image sensor 101. The embodiment shown in FIG. 12A comprises baffles 108 configured to be dome-shaped and configured to form void 303 that has a dome-like shape (i.e., a dome-shaped void 303). Baffle inner surfaces 112 may be coated with inner surface coating 904, which in some aspects, may be a specular coating, such as a reflective metallized coating or a coating comprising scattering diffusers 301 such as rough particles.

FIG. 12B is a schematic, perspective view of baffle 108 configured to be dome-shaped that defines dome-shaped void 303. Some spectral imager 100 embodiments comprising baffles 108 that define dome-shaped voids 303 and that are configured for enhancing specular reflection may comprise one or more EMR concentrating elements, which may be one or more external optic such as for example a microlens 1003 positioned and configured to receive incident EMR 107 and pass it to optical homogenizer 106 that is positioned at baffle opening 308.

As used herein, the terms "dome-like shape", "dome-shape", "dome-shaped", and variations thereof, when describing baffle 108 or a void 303 defined by baffle 108, may refer in some aspects to a shape substantially similar to the hollow upper half of a sphere (i.e., a hollow hemisphere). However, a dome-like shape of void 303 or baffle 108 need not be a complete hemisphere. In some aspects, "dome-shape" or "dome-like shape" may refer to any of numerous other dome-like shapes such as for example any fraction of a hemisphere, e.g., an upper quarter of a sphere or other such portion of a hemisphere (e.g., a segmental dome), a cloister vault (also referred to sometimes as a pavilion vault or domical vault, such as that shown in FIG. 12B in which baffle lower edges 303 form a rectangular shape), a conical dome, a pointed dome, a faceted dome, or any other dome-shaped structure compatible with the manufacturing and functional requirements of spectral imager 100. It is to be noted that a "dome-shaped" baffle 108 or void 303 defined by baffle 108 may also refer to a baffle or void in which a "dome-shape" or "dome-like shape" is a portion of baffle 108 or void 303. By way of example only, a dome-shaped baffle 108 may comprise a structure in which a dome-shaped region is surmounted on a rectangular cuboid, such that an upper region of baffle 108 is dome-shaped and a lower region is cuboidal having baffle lower edge 306 that forms a footprint having a square or a rectangular shape.

FIG. 13 is an exemplary embodiment for fabricating a spectral imager 100 comprising baffles 108 that define dome-shaped voids 303 and that function in a manner similar to an integrating sphere. At (a), a silicon substrate 901 is provided and an oxide layer 1301 is grown on the silicon wafer. At (b), the silicon wafer substrate 901 is bonded to a handle wafer (not shown), back-thinned, polished, and flipped. At (c), domed-shaped baffles 108 are formed by isotropic etching, such as for example etching with $XeF_2$ or isotropic $SF_6$ plasma. When the etching process reaches oxide layer 1301, baffle opening 308 may be formed. In some aspects, it may be useful to utilize the etching process for intentionally introducing surface texture or imperfections on baffle inner surface 112, such as by way of example only baffle inner surface 112 asymmetry or a wavy baffle inner surface 112, for reducing caustic effects and promoting spatial homogenization of incident EMR 107. In some aspects, a baffle inner surface 112 may be faceted, i.e., inner surface 112 texturing may produce facets. At (d), coatings 904, which may function as diffusers 301 for improving spatial homogenization of incident EMR 107, may optionally be applied. By way of example only, coatings 904 may comprise one or more antireflective layers on oxide layer 1301, or a reflective film on baffle inner surface 112 e.g., an aluminum, gold, or silver film for reflection. Additional diffusers 301 such as disordered dielectric microparticles (e.g., titania) may be positioned in void 303, at interface 1303 between oxide layer 1301 and void 303, or as a coating 904 on baffle inner surface 112. Following the optional application of coatings 904 to baffle inner surfaces 112, at (e) the formed structure shown in (d) may then be integrated with image sensor 101 and debonded from any handle wafer that may have been used in processing. Optionally, at (f) one or more external optics such as for example microlenses 1003 may be integrated on the exterior surface of oxide layer 1301 to promote transmission of received EMR 107 through baffle opening 308. It is not a requirement that all steps be performed in the order shown. One skilled in the art of micro-fabrication of spectral imaging components will understand that some intermediate steps, such as for example lithographic processing, are not explicitly shown. Some embodiments of spectral imager 100 may have alternative configurations that require different or additional methods of fabrication.

EXAMPLES

FIGS. 14A-14F are top-down schematic views of exemplary superpixel arrays 102 and baffle lower edge 306 footprints, including exemplary configurations and dimensions of selected elements for use with a spectral imager 100. In some exemplary embodiments, one or more baffle lower edge 306 is shaped as a square or a rectangle. The exemplary superpixels 103 and superpixel arrays 102 shown in FIGS. 14A-14F may be used to configure selected spectral imager 100 embodiments for operation in one or more specific regions of the EMR spectrum. In many embodiments of spectral imager 100, the exemplary configurations and dimensions of superpixel pitches 1404, pixel pitches 1402, and associated distances 1302 between opposing baffle 108 walls may be useful with a variety of baffle 108 and void 303 configurations.

In many embodiments, spectral imager 100 may be configured to further comprise one or more "structural street" and/or "non-structural street". The exemplary embodiments shown in FIGS. 14A-F are illustrated as having "structural streets" or "non-structural streets". As used herein, in some aspects a "structural street" refers to a mechanical structure (e.g., baffle 108 wall) whose thickness (e.g., baffle wall width 304) and position are such that the structure largely blocks a row and/or a column of pixels from exposure to spatially homogenized EMR 109. Generally, a structure is defined as a "structural street" if it blocks exposure to spatially homogenized EMR 109 of an underlying row or column of pixels 104 by more than about 50% as compared to the exposure of an unblocked row or column of pixels 104. In other aspects, a structure (e.g., baffle 108 wall) may be considered a "non-structural street" if it does not block exposure of a row or column of pixels 104 to spatially homogenized EMR 109 by more than about 50%. By way of example only, for the embodiment shown in FIG. 14A, the walls of baffles 108 function as structural streets because they block exposure of the underlying row of surrounding pixels 104 (the "pixel street" as taught below in Example 1) to spatially homogenized EMR 109 by more than about 50% as compared to the exposure of an unblocked row or column of pixels 104.

It should be understood that, although the exemplary embodiments depicted in FIGS. 14A-F are shown as having either structural streets or non-structural streets, these are exemplary for purposes of explanation. In some embodiments, spectral imager 100 may be made with baffles 108 whose walls function only as non-structural streets or only as structural streets. In some embodiments, spectral imager 100 may be made such that some baffle 108 walls (or other structures) function as structural streets and some baffle 108 walls (or other structures) function as non-structural streets. In many embodiments, the utilization of a "structural street" in a spectral imager 100 may be based on engineering decisions and functional goals for a spectral imager embodiment. Some exemplary factors to be considered when deciding on whether to include or not include a structural street include the number of available pixels 104 on image sensor 101, the degree of optical isolation required between superpixels 103, the amount or availability of EMR in a spectral region of interest, and the structural integrity of the micro-optical elements of spectral imager 100.

Example 1

Figure 14A:
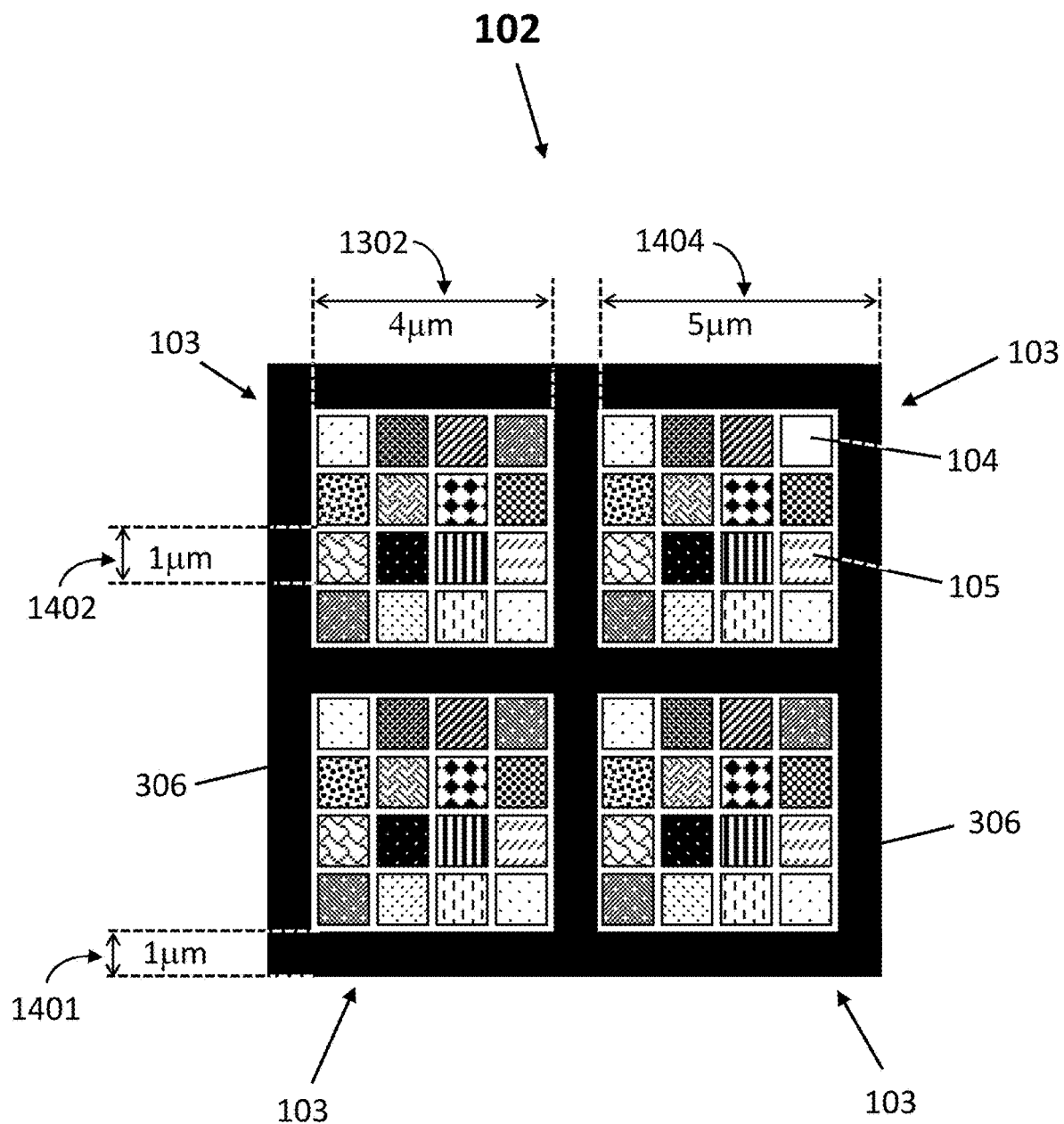
FIGS. 14A-14F are top-down schematic views of exemplary superpixel arrays and baffle lower edge footprints.

In some embodiments, a spectral imager 100 configured as described here and as depicted in FIG. 14A may be useful in applications with EMR in the visible and near infrared regions (i.e., the VNIR region) of the EMR spectrum. FIG. 14A depicts an exemplary configuration of a superpixel array 102, comprising four superpixels 103 positioned on a superpixel pitch 1404 of about 5 µm, each superpixel 103 having a 16 band (4×4) arrangement of pixels 104, the pixels being on a pitch 1402 of about 1 µm and positioned to be exposed to spatially homogenized EMR 109. The footprint of baffle bottom edges 306 is represented as thick black lines surrounding each 4×4 pixel group. At baffle bottom edges 306, distance 1302 between opposing baffle 108 walls is about 4 µm. Each 4×4 pixel group is surrounded by a row of pixels 104 on each side, the surrounding pixels 104 also being on a pitch 1401 of about 1 µm and positioned beneath baffle bottom edges 306 and as such are not visible in the drawing. The row of surrounding pixels 104 is referred to as a "pixel street". In this exemplary embodiment, the pixel street is blocked from exposure to spatially homogenized EMR 109 by baffle 108 walls. For use in the VNIR region, a spectral imager 100 comprising the embodiment shown in FIG. 14A may comprise a wafer substrate 901 that is thinned (as in FIG. 9 at step (g) or in FIG. 13 at step (b)) to a thickness of from about 3 µm to about 10 µm. The spectral imager 100 for use in the VNIR region may be further configured to comprise baffle inner surfaces 112 having an ~50 nm thick coating 904 of ALD-protected Al or Ag if a reflective coating is desired. To produce a version of this configuration comprising dome-shaped baffles 108, substrate 901 may be etched (as in FIG. 13 at step (c)) such that each baffle bottom edge 306 forms a substantially square or a square shape. In addition, spectral imager 100 may comprise microlenses 1003 integrated on the exterior of oxide layer 1301, for enhancing the transmission of EMR through baffle opening 308.

Example 2

Figure 14B:
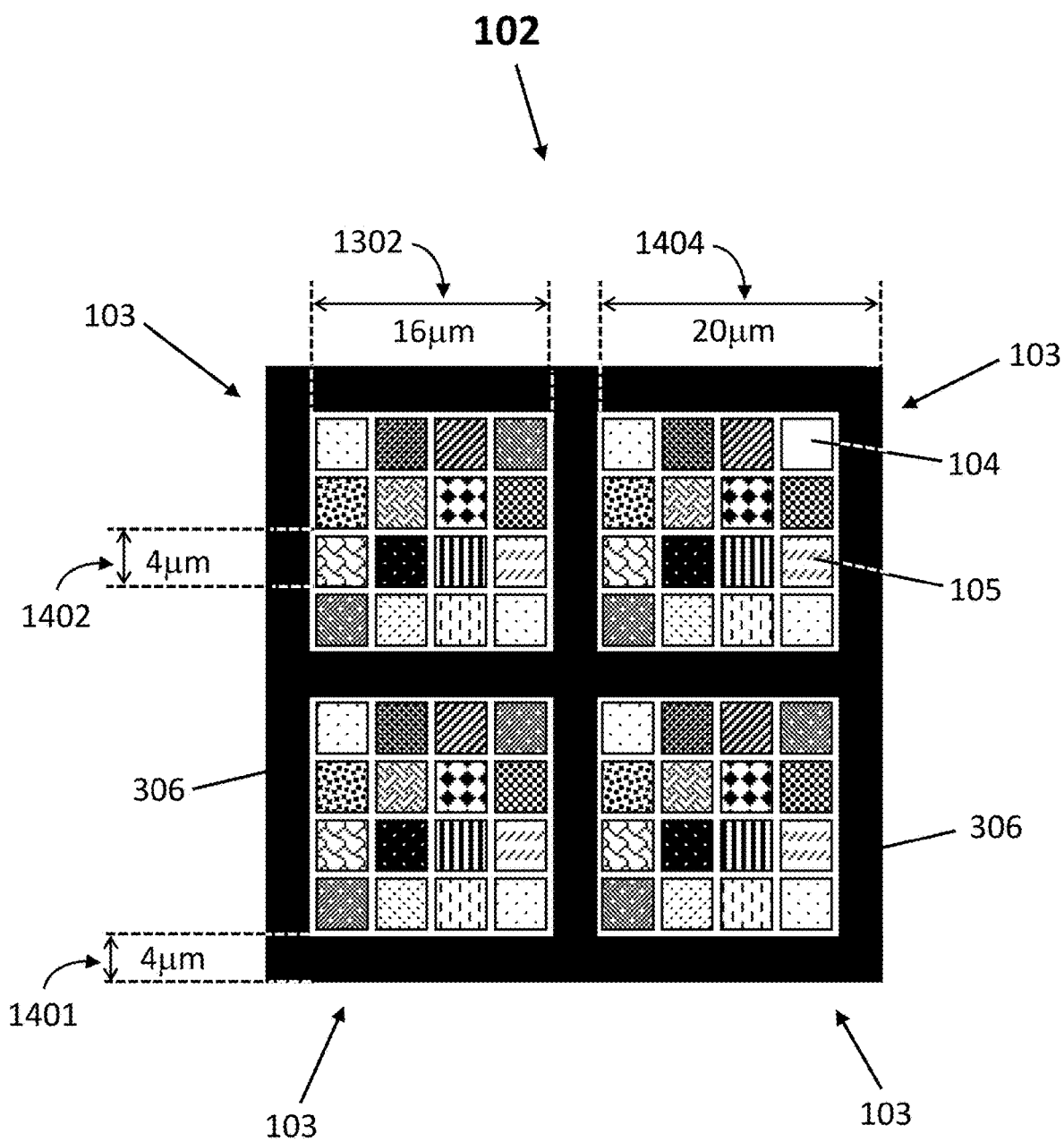

In some embodiments, spectral imager 100 configured as described here and as depicted in FIG. 14B may be useful in applications with EMR in the UV and/or in the VNIR regions of the EMR spectrum. FIG. 14B depicts an exemplary configuration of a superpixel array 102, comprising four superpixels 103 positioned on a superpixel pitch 1404 of about 20 µm, each superpixel having a 16 band (4×4) arrangement of pixels 104, the pixels being on a pitch 1402 of about 4 µm and positioned to be exposed to spatially homogenized EMR 109. The footprint of baffle bottom edges 306 is represented as thick black lines surrounding each 4×4 pixel group. At baffle bottom edges 306, distance 1302 between opposing baffle 108 walls is about 16 µm. Each 4×4 pixel group is surrounded by a pixel street comprising pixels 104 on each side, the surrounding pixels also being on a pitch 1401 of about 4 µm and positioned beneath baffle bottom edges 306. In this exemplary embodiment, the pixel street is blocked from exposure to spatially homogenized EMR 109 by baffle 108 walls. The thick walls of baffles 108 function as structural streets in this exemplary embodiment, but this is not a requirement for the indicated application. A spectral imager 100 comprising the embodiment shown in FIG. 14B may comprise a wafer substrate 901 that is thinned (as in FIG. 9 at step (g) or FIG. 13 at step (b)) to a thickness of from about 10 µm to about 20 µm, which will depend on the degree of anisotropy of the etch. In this embodiment, spectral imager 100 may be further configured to comprise baffle inner surfaces 112 having an ~50 nm thick coating 904 of ALD-protected Al or Ag. To produce a version of this configuration using dome-shaped baffles 108, the substrate 901 may be etched (as in FIG. 13 at step (c)) such that each baffle bottom edge 306 forms a square or substantially square shape. In addition, this embodiment may comprise microlenses integrated on the exterior of oxide layer 1301, for enhancing the transmission of EMR through baffle opening 308.

Example 3

Figure 14C:
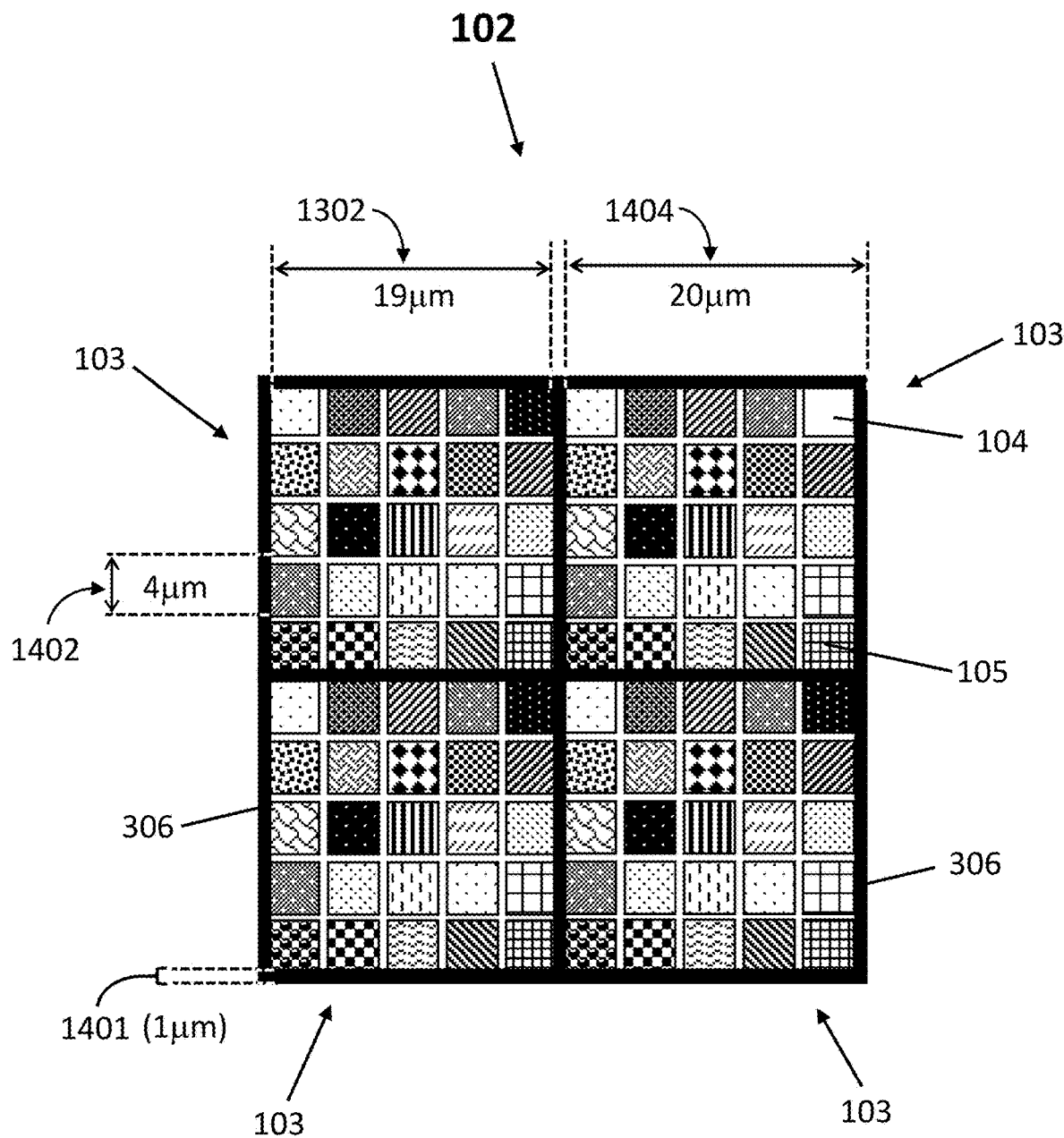

In some embodiments, spectral imager 100 configured as described here and as depicted in FIG. 14C may be useful in applications with EMR in the UV and/or in the VNIR regions of the EMR spectrum. FIG. 14C depicts an exemplary configuration of a superpixel array 102, comprising four superpixels 103 positioned on a superpixel pitch 1404 of about 20 µm, each superpixel having a 25 band (5×5) arrangement of pixels 104, the pixels being on a pitch 1402 of about 4 µm and positioned to be exposed to spatially homogenized EMR 109. The footprint of baffle bottom edges 306 is represented as thick black lines surrounding each 5×5 pixel group. At baffle bottom edges 306, distance 1302 between opposing baffle 108 walls is about 19 µm. Each 5×5 pixel group is surrounded by an ~1 µm non-structural street on each side, the non-structural street being formed by baffle 108 walls. In this exemplary embodiment, the non-structural street only blocks a small region of each pixel 104, at the edge of superpixels 103, from exposure to spatially homogenized EMR 109. A spectral imager 100 comprising the embodiment shown in FIG. 14C may comprise a wafer substrate 901 that is thinned (as in FIG. 9 at step (g) or FIG. 13 at step (b)) to a thickness of from about 10 µm to about 20 µm. In this embodiment, spectral imager 100 may be further configured to comprise baffle inner surfaces 112 having an ~50 nm thick coating 904 of ALD-protected Al or Ag. To produce a version of this configuration using dome-shaped baffles 108, substrate 901 may be etched (as in FIG. 13 at step (c)) such that each baffle bottom edge 306 forms a square or substantially square shape. In addition, this embodiment may comprise microlenses integrated on the exterior of oxide layer 1301, for enhancing the transmission of EMR through baffle opening 308.

Example 4

Figure 14D:
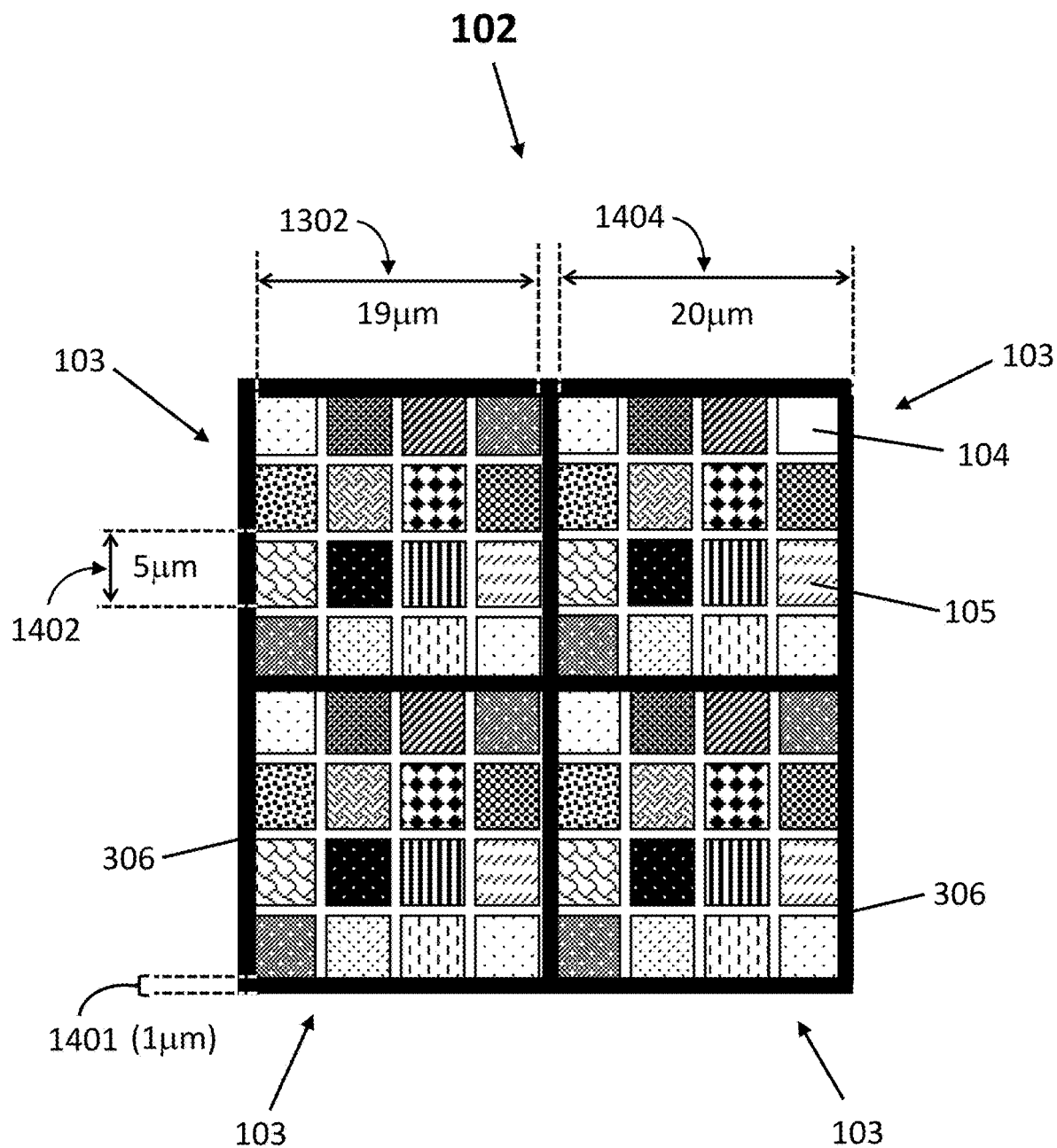

In some embodiments, spectral imager 100 configured as described here and as depicted in FIG. 14D may be useful in applications with EMR in the SWIR region of the EMR spectrum. FIG. 14D depicts an exemplary configuration of a superpixel array 102, comprising four superpixels 103 positioned on a superpixel pitch 1404 of about 20 µm, each superpixel having a 16 band (4×4) arrangement of pixels 104, the pixels being on a pitch 1402 of about 5 µm and positioned to be exposed to spatially homogenized EMR 109. The footprint of baffle bottom edges 306 is represented as thick black lines surrounding each 4×4 pixel group. At baffle bottom edges 306, distance 1302 between opposing baffle 108 walls is about 19 µm. Each 4×4 pixel group is surrounded by an ~1 µm non-structural street on each side, the non-structural street being formed by baffle 108 walls. In this exemplary embodiment, the non-structural street only blocks a small region of each pixel 104, at the edge of superpixels 103, from exposure to spatially homogenized EMR 109. By way of example only, a spectral imager 100 comprising the embodiment shown in FIG. 14D may comprise a wafer substrate 901 that is thinned (as in FIG. 9 (g) or FIG. 13 (b)) to a thickness of from about 10 µm to about 20 µm, which will depend on the degree of anisotropy of the etch. In this embodiment, spectral imager 100 may be further configured to comprise baffle inner surfaces 112 having an ~50 nm thick coating 904 of Au. To produce a version of this configuration using dome-shaped baffles 108, substrate 901 may be etched (as in FIG. 13 at step (c)) such that each baffle bottom edge 306 forms a square or substantially square shape.

Example 5

Figure 14E:
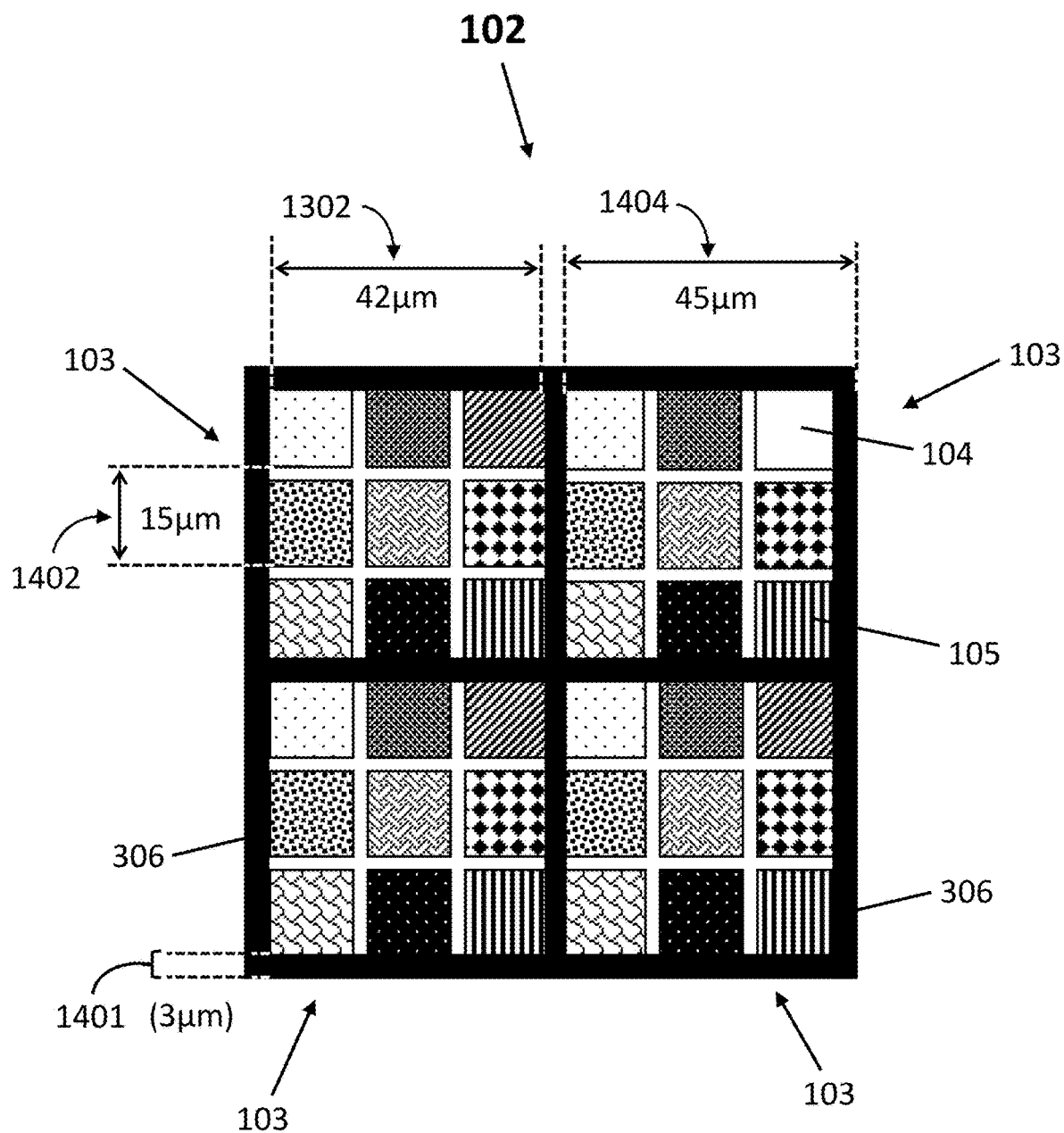

In some embodiments, spectral imager 100 configured as described here and as depicted in FIG. 14E may be useful in applications with EMR in the MWIR or LWIR regions of the EMR spectrum. FIG. 14E depicts an exemplary configuration of a superpixel array 102, comprising four superpixels 103 positioned on a superpixel pitch 1404 of about 45 µm, each superpixel having a 9 band (3×3) arrangement of pixels 104, the pixels being on a pitch 1402 of about 15 µm and positioned to be exposed to spatially homogenized EMR 109. The footprint of baffle bottom edges 306 is represented as thick black lines surrounding each 3×3 pixel group. At baffle bottom edges 306, distance 1302 between opposing baffle 108 walls is about 42 µm. Each 3×3 pixel group is surrounded by an approximately 3 µm non-structural street on each side, the non-structural street being formed by baffle 108 walls. In this exemplary embodiment, the non-structural street only blocks a small region of each pixel 104, at the edge of superpixels 103, from exposure to spatially homogenized EMR 109. By way of example only, a spectral imager 100 comprising the embodiment shown in FIG. 14E may comprise a wafer substrate 901 that is thinned (as in FIG. 9 at step (g) or FIG. 13 at step (b)) to a thickness of from about 22 µm to about 45 µm, which will depend on the degree of anisotropy of the etch. For use with EMR in the LWIR region it may be preferable to remove oxide layer 1301 if one was added during fabrication, which may be done with an HF cleaning step for example. In this embodiment, spectral imager 100 may be further configured to comprise baffle inner surfaces 112 having an ~50 nm thick coating 904 of Au. To produce a version of this configuration using dome-shaped baffles 108, substrate 901 may be etched (as in FIG. 13 at step (c)) such that each baffle bottom edge 306 forms a square or substantially square shape.

Example 6

Figure 14F:
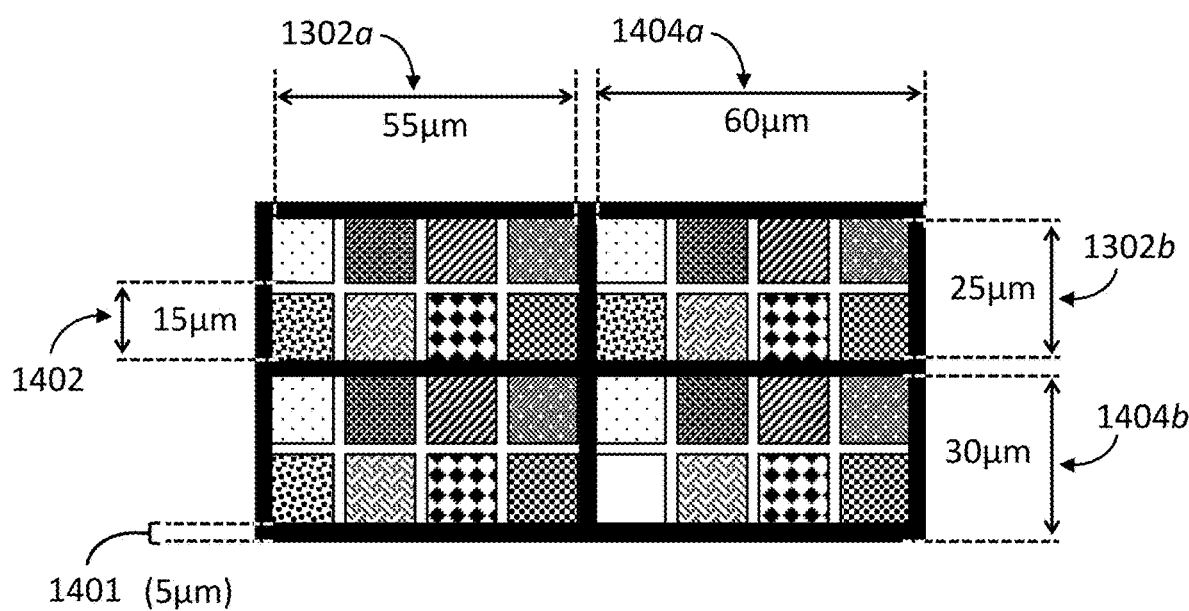

In some embodiments, spectral imager 100 configured as described here and as depicted in FIG. 14F may be useful in applications with EMR in the LWIR region of the EMR spectrum. FIG. 14F depicts an exemplary configuration of a superpixel array 102 comprising four superpixels 103, each superpixel having a 4×2 arrangement of pixels 104, the pixels being on a pitch 1402 of about 15 µm and positioned to be exposed to spatially homogenized EMR 109. On the longer edge of superpixel array 102, superpixels 103 are positioned on a superpixel pitch 1404a of about 60 µm. On the shorter edge of superpixel array 102, superpixels 103 are positioned on a superpixel pitch 1404b of about 30 µm. The footprint of baffle bottom edges 306 is represented as thick black lines surrounding each 4×2 pixel group. At baffle bottom edges 306, distance 1302a between a first pair of opposing baffle 108 walls is about 55 µm. At baffle bottom edges 306, distance 1302b between a second pair of opposing baffle 108 walls is about 25 µm. Each 4×2 pixel group is surrounded by an approximately 5 µm non-structural street on each side, the non-structural street being formed by baffle 108 walls. In this exemplary embodiment, the non-structural street only blocks a small region of each pixel 104, at the edge of superpixels 103, from exposure to spatially homogenized EMR 109. By way of example only, a spectral imager 100 comprising the embodiment shown in FIG. 14F may comprise a wafer substrate 901 that is thinned (as in FIG. 13 at step (b)) to a thickness of from about 30 µm to about 60 µm, which will depend on the degree of anisotropy of the etch. For use with EMR in the LWIR region it may be preferable to remove oxide layer 1301 if one was added during fabrication, which may be done with an HF cleaning step for example. In this embodiment, spectral imager 100 may be further configured to comprise baffle inner surfaces 112 having a 50 nm thick coating 904 of Au. To produce a version of this configuration using dome-shaped baffles 108, substrate 901 may be etched (as in FIG. 13 at step (c)) such that each baffle bottom edge 306 forms a rectangular or substantially rectangular shape.

It should be understood that the detailed description and the specific examples, while indicating specific embodiments of the invention, are given by way of illustration only, since various changes, alternatives, variations, and modifications within the spirit and scope of the invention are possible and would be apparent to those skilled in the art from this detailed description. Other objects, features and advantages of the present invention will be apparent from the detailed description.

What is claimed is:

1. A spectral imager comprising:
   an image sensor comprising a superpixel array having a plurality of superpixels, each superpixel comprising at least four pixels;
   a plurality of optical homogenizers, each optical homogenizer being in-register with a corresponding different superpixel in the superpixel array, being positioned to receive electromagnetic radiation (EMR), and being configured to spatially homogenize the received EMR and to pass the spatially homogenized EMR to the in-register, corresponding different superpixel;
   an optical filter array positioned between each optical homogenizer and the in-register, corresponding different superpixel and comprising a plurality of spectral filters, wherein at least four spectral filters in the plurality of spectral filters are configured to spectrally filter the spatially homogenized EMR differently from one another and to pass the spectrally filtered, spatially homogenized EMR to the in-register, corresponding different superpixel, and wherein each of the at least four pixels is in-register with a different one of the at least four differently configured spectral filters and is positioned to receive the spectrally filtered, spatially homogenized EMR passed by the in-register spectral filter; and,
   a plurality of baffles, each baffle being configured and positioned to maximize confinement of the spatially homogenized EMR passed by a single optical homogenizer in the plurality of optical homogenizers to the in-register, corresponding different superpixel.

2. The spectral imager of claim 1, wherein one or more of the at least four spectral filters are further configured to spectropolarimetrically filter the spatially homogenized EMR.

3. The spectral imager of claim 1, wherein the optical filter array further comprises one or more polarization filters, the one or more polarization filters each being in register with a single, corresponding different pixel of the at least four pixels.

4. The spectral imager of claim 1, wherein at least one baffle is further configured to spatially homogenize the received EMR.

5. The spectral imager of claim 1, wherein at least one baffle is dome-shaped.

6. The spectral imager of claim 1, wherein at least one baffle comprises an inner surface having a reflective coating.

7. The spectral imager of claim 1, wherein at least one baffle comprises an EMR-absorbing inner surface.

8. The spectral imager of claim 7, wherein the EMR-absorbing inner surface comprises CuO.

9. The spectral imager of claim 1, further comprising a microlens array having one or more microlenses, wherein each microlens is configured to receive incident EMR and pass the received, incident EMR to an in-register, corresponding different optical homogenizer.

10. The spectral imager of claim 1, further comprising an imaging optic.

11. The spectral imager of claim 1, further comprising a camera.

12. The spectral imager of claim 1, further comprising a non-structural street.

13. The spectral imager of claim 1, further comprising a structural street.

14. The spectral imager of claim 1, wherein each optical homogenizer in the plurality of optical homogenizers comprises at least one of a surface homogenizer, a volume homogenizer, or a baffle inner surface configured to cause or enhance spatial homogenization of the received EMR.

15. The spectral imager of claim 14, wherein at least one optical homogenizer in the plurality of optical homogenizers comprises a volume homogenizer.

16. The spectral imager of claim 14, wherein at least one optical homogenizer in the plurality of optical homogenizers comprises a surface homogenizer.

17. The spectral imager of claim 1, configured to operate in at least one of the ultraviolet region, the visible region, or the infrared region of the EMR spectrum.

18. The spectral imager of claim 17 configured to operate in the VNIR band of the EMR spectrum.

19. The spectral imager of claim 17, configured to operate in the LWIR band of the EMR spectrum.

20. A method of determining spectral information about EMR incident on the spectral imager of claim 1, the method comprising the steps of:
- exposing the spectral imager of claim 1 to incident EMR;
- measuring an electrical response of the at least four pixels in each corresponding different superpixel to the spectrally filtered, spatially homogenized EMR passed to the at least four pixels;
- based on analysis of the electrical responses of the at least four pixels in each corresponding different superpixel, determining spectral information about the EMR received by the optical homogenizer and passed to the in-register corresponding different superpixel.

* * * * *